United States Patent
LeMasters et al.

(10) Patent No.: US 11,423,186 B2
(45) Date of Patent: Aug. 23, 2022

(54) VERIFIED INTER-MODULE COMMUNICATIONS INTERFACE

(71) Applicant: CrowdStrike, Inc., Irvine, CA (US)

(72) Inventors: Aaron LeMasters, New York, NY (US); Ion-Alexandru Ionescu, Seattle, WA (US)

(73) Assignee: CrowdStrike, Inc., Irvine, CA (US)

( * ) Notice: Subject to any disclaimer, the term of this patent is extended or adjusted under 35 U.S.C. 154(b) by 570 days.

(21) Appl. No.: 16/248,315

(22) Filed: Jan. 15, 2019

(65) Prior Publication Data
US 2019/0220627 A1 Jul. 18, 2019

Related U.S. Application Data

(60) Provisional application No. 62/618,413, filed on Jan. 17, 2018.

(51) Int. Cl.
| | | |
|---|---|---|
| *G06F 3/00* | (2006.01) | |
| *G06F 21/85* | (2013.01) | |
| *G06F 13/40* | (2006.01) | |
| *G06F 21/54* | (2013.01) | |

(52) U.S. Cl.
CPC .......... *G06F 21/85* (2013.01); *G06F 13/4068* (2013.01); *G06F 21/54* (2013.01)

(58) Field of Classification Search
CPC ...... G06F 13/00; G06F 21/85; G06F 13/4068; G06F 21/54
See application file for complete search history.

(56) References Cited

U.S. PATENT DOCUMENTS

| | | |
|---|---|---|
| 6,658,489 B1 | 12/2003 | Asselin |
| 7,216,344 B2 | 5/2007 | Cobb et al. |
| 7,979,869 B2 | 7/2011 | Manczak et al. |
| 8,464,238 B1 | 6/2013 | Chakraborty et al. |

(Continued)

FOREIGN PATENT DOCUMENTS

WO    WO2006023685    3/2006

OTHER PUBLICATIONS

The Extended European Search Report dated May 23, 2019 for European Patent Application Mo. 19152047.7, 6 pages.

(Continued)

*Primary Examiner* — Henry Tsai
*Assistant Examiner* — Kim T Huynh
(74) *Attorney, Agent, or Firm* — Lee & Hayes, P.C.

(57) ABSTRACT

Some example computing systems herein include two modules, e.g., drivers. A first can instantiate an interface associated with a service routine, receive, by the service routine, a verification message; and send, in response, a confirmation message via the interface. A second can locate the interface; open a handle to the interface; send the verification message via the handle, the verification message identifying at least an interface type or a version; and receive, via the handle, the confirmation message associated with the verification message. In some examples, the first driver is a Plug and Play driver. In some examples, the first module can receive, by the service routine, a command associated with the interface; determine that the command is a valid command based at least in part on stored command data; and send, via the interface, a response to the command.

21 Claims, 9 Drawing Sheets

(56) References Cited

U.S. PATENT DOCUMENTS

| | | | | |
|---|---|---|---|---|
| 8,582,139 | B2* | 11/2013 | Metz | G06F 9/4411 |
| | | | | 358/1.15 |
| 9,032,394 | B1 | 5/2015 | Shi et al. | |
| 9,256,440 | B1 | 2/2016 | Cattaneo | |
| 2003/0037237 | A1* | 2/2003 | Abgrall | H04L 63/123 |
| | | | | 713/166 |
| 2008/0034429 | A1 | 2/2008 | Schneider | |
| 2009/0089815 | A1* | 4/2009 | Manczak | G06F 9/45558 |
| | | | | 719/327 |
| 2014/0129846 | A1 | 5/2014 | Wang et al. | |
| 2015/0074301 | A1* | 3/2015 | Kawamura | G06F 13/102 |
| | | | | 710/104 |
| 2017/0097910 | A1* | 4/2017 | Kumar | G06F 13/28 |
| 2019/0220260 | A1 | 7/2019 | Gutman et al. | |

OTHER PUBLICATIONS

European Office Action dated Jan. 15, 2021 for European Patent Application No. 1952047.7, a counterpart foreign application of U.S. Appl. No. 16/248,315, 3 pages.

AnthonyUSIP et al., "K1000 Problem Deploying the Crowdstrike Falcon Sensor on our Client Machines Without User Interaction", Jul. 9, 2014, retrieved Jan. 10, 2019 from <<https://www.itninja.com/question/hi-i-m-trying-to-deploy-crowdstrike-falcon-sensor-on-our-client-machines-and-i-get-everything-right-however-it-pronts-the-users-to-hit-continue-and-i-don-t-want-any-user-interaction-if-possible>>, 3 pages.

"Device Nodes and Device Stacks", Apr. 19, 2017, retrieved Dec. 26, 2018 from <<https://docs.microsoft.com/en-us/windows-hardware/drivers/gettingstarted/device-nodes-and-device-stacks>>, 8 pages.

"Driver Stacks", Apr. 19, 2017, retrieved Dec. 26, 2018 from <<https://docs.microsoft.com/en-us/windows-hardware/drivers/gettingstarted/driver-stacks>>, 5 pages.

"DriverEntry's Required Responsibilities", Jun. 15, 2017, retrieved Dec. 29, 2018 from <<https://docs.microsoft.com/en-us/windows-hardware/drivers/kernel/driverentry-s-required-responsibilities>>, 1 page.

The Extended European Search Report dated Jun. 12, 2019 for European Patent Application No. 19152042.8, 6 pages.

Ingebrigtsen, P., "How to Manage Updates in Falcon", Sep. 21, 2016, retrieved Jan. 10, 2019 from <<https://www.crowdstrike.com/blog/tech-center/update-falcon-sensor/>>, 7 pages.

Ionescu, A., "Bringing Call Gates Back", Aug. 7, 2017, retrieved Jan. 14, 2019 from <<http://www.alex-ionescu.com/?p=340>>, 10 pages.

"Meandering Through the Object Manager—How to Get from Create to a Target Device Object", The NT Insider, Mar. 16, 2005, vol. 12, Issue 2, 7 pages.

Microsoft, "Accessing and Modifying Files", Apr. 19, 2017, retrieved Jan. 2, 2019 from <<https://docs.microsoft.com/en-us/windows-hardware/drivers/install/accessing-and-modifying-files>>, 1 page.

Microsoft, "Avoiding System Restarts during Device Installation and Driver Updates", Apr. 19, 2017, retrieved Jan. 2, 2019 from <<https://docs.microsoft.com/en-us/windows-hardware/drivers/install/avoiding-system-restarts-during-device-installations>>, 2 pages.

Microsoft, "Changing Interfaces in a Backward Compatible Manner", May 30, 2018, retrieved Jan. 8, 2019 from <<https://docs.microsoft.com/en-us/windows/desktop/rpc/changing-interfaces-in-a-backward-compatible-manner>> 3 pages.

Microsoft, "Device Installations and System Restarts", Apr. 19, 2017, retrieved Jan. 2, 2019 from <<https://docs.microsoft.com/en-us/windows-hardware/drivers/install/device-installations-and-system-restarts>>, 1 page.

Microsoft, "Examples of Incompatible Changes" May 30, 2018, retrieved Jan. 8, 2019 from <<https://docs.microsoft.com/en-us/windows/desktop/rpc/examples-of-incompatible-changes>>, 1 page.

Microsoft, "INF DDInstall.HW Section", Apr. 19, 2017, retrieved Jan. 2, 2019 from <<https://docs.microsoft.com/en-us/windows-hardware/drivers/install/inf-ddinstall-hw-section>>, 4 pages.

Microsoft, "INF DelFiles Directive" Apr. 19, 2017, retrieved Jan. 2, 2019 from <<https://docs.microsoft.com/en-us/windows-hardware/drivers/install/inf-delfiles-directive>> 4 pages.

Microsoft, "INF Version Section" Apr. 19, 2017, retrieved Jan. 2, 2019 from <<https://docs.microsoft.com/en-us/windows-hardware/drivers/install/inf-version-section>> 6 pages.

Microsoft, "Step 1: The New Device is Identified", Apr. 19, 2017, retrieved Jan. 2, 2019 from <<https://docs.microsoft.com/en-us/windows-hardware/drivers/install/step-1--the-new-device-is-identified>>, 2 pages.

Microsoft, "Step 2 A Driver for the Device is Selected", Apr. 19, 2017, retrieved Jan. 2, 2019 from <<https://docs.microsoft.com/en-us/windows-hardware/drivers/install/step-2--a-driver-for-the-device-is-selected>>, 3 pages.

Microsoft, "Step 3: The Driver for the Device is Installed", Apr. 19, 2017, retrieved Jan. 2, 2019 <<https://docs.microsoft.com/en-us/windows-hardware/drivers/install/step-3--the-driver-for-the-device-is-installed>>, 2 pages.

Microsoft, "The Versioning Theory for RPC and COM", May 30, 2018, retrieved Jan. 8, 2019 from <<https://docs.microsoft.com/en-us/windows/desktop/rpc/the-versioning-theory-for-rpc-and-com>>, 1 page.

Microsoft, "Update Driver for Plug and Play Devices a Function", Dec. 4, 2018, retrieved Jan. 2, 2019 from <<https://docs.microsoft.com/en-us/windows/desktop/api/newdev/nf-newdev-updatedriverforplugandplaydevicesa>>, 4 pages.

Microsoft, "Updated Driver Files", Apr. 19, 2017, retrieved Jan. 2, 2019, from <<https://docs.microsoft.com/en-us/windows-hardware/drivers/install/updating-driver-files>>, 2 pages.

Microsoft, "Viewing Hidden Devices", Apr. 19, 2017, retrieved Jan. 2, 2019 from <<https://docs.microsoft.com/en-us/windows-hardware/drivers/install/viewing-hidden-devices>>, 2 pages.

"Registering for Device Notification", May 30, 2018, retrieved Dec. 28, 2018 from <<https://docs.microsoft.com/en-us/windows/desktop/devio/registering-for-device-notification>>, 11 pages.

Spero, Simon E., "Introduction to ASN.1 and the Packed Encoding Rules", Jan. 1, 2015, 3 pages.

Teng, C-L., "Enumerating Windows Device" Jun. 16, 2006, retrieved Dec. 26, 2018 from <<https://www.codeproject.com/Articles/14412/Enumerating-windows-device>>, 18 pages.

"Whats New for WDF Drives", Dec. 5, 2018, pp. 25-38, 41-45, 316-329, and 441-477.

Non Final Office Action dated Jul. 10, 2020 for U.S. Appl. No. 16/248,551, "Device Driver Non-Volatile Backing-Store nstallation", Gutman, 21 pages.

European Office Action dated Mar. 31, 2022 for European Patent Application No. 19152047.7, a foreign counterpart to U.S. Appl. No. 16/248,315, 4 pages.

\* cited by examiner

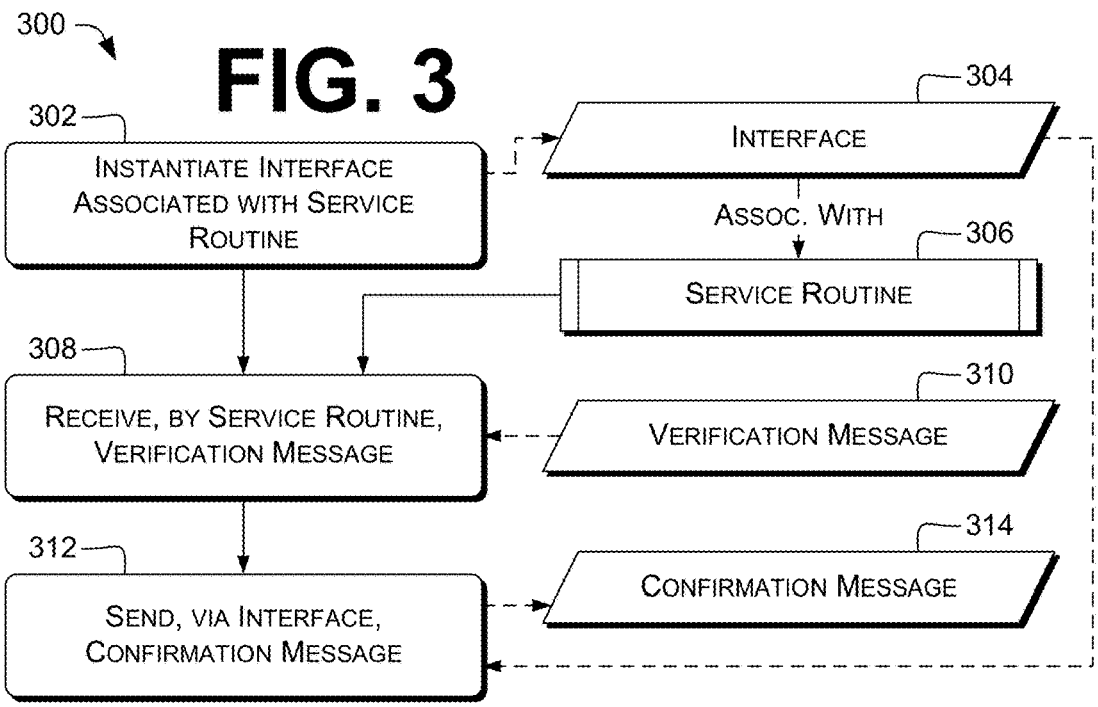
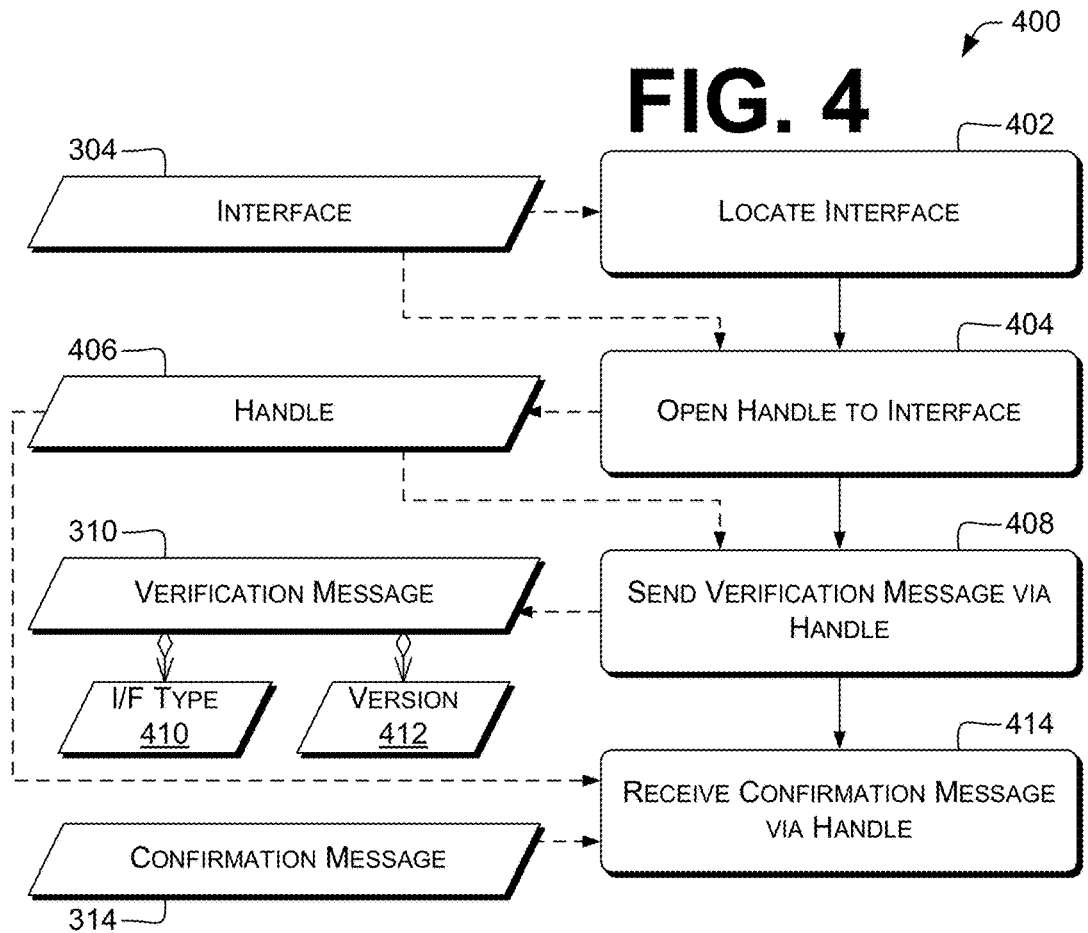

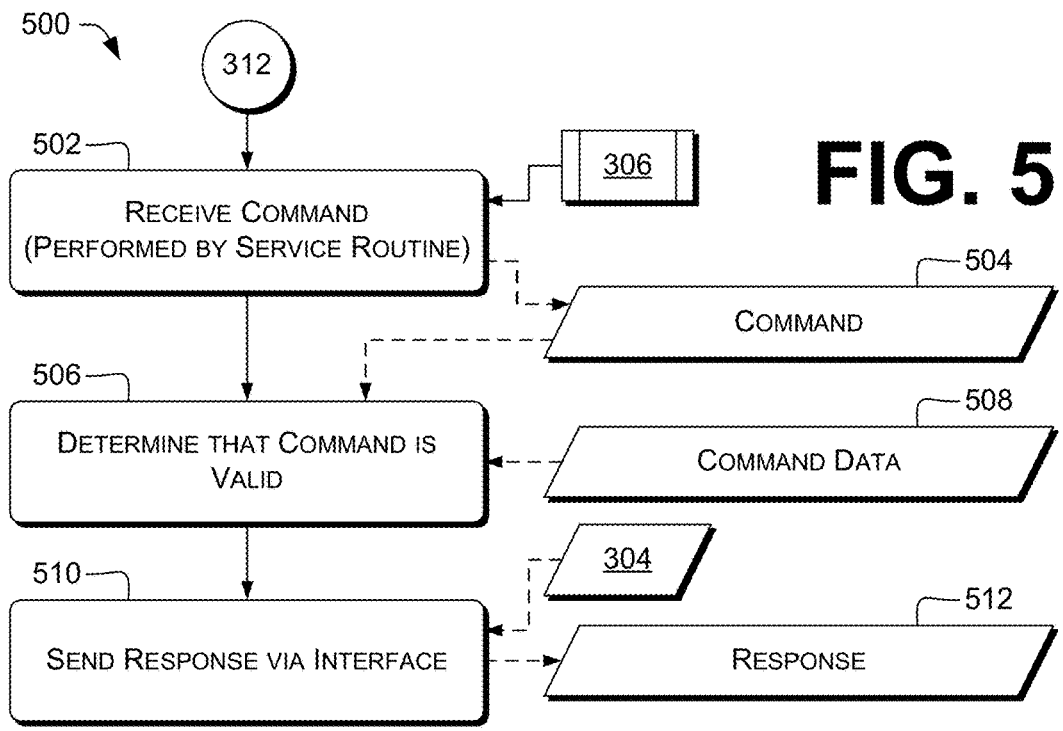
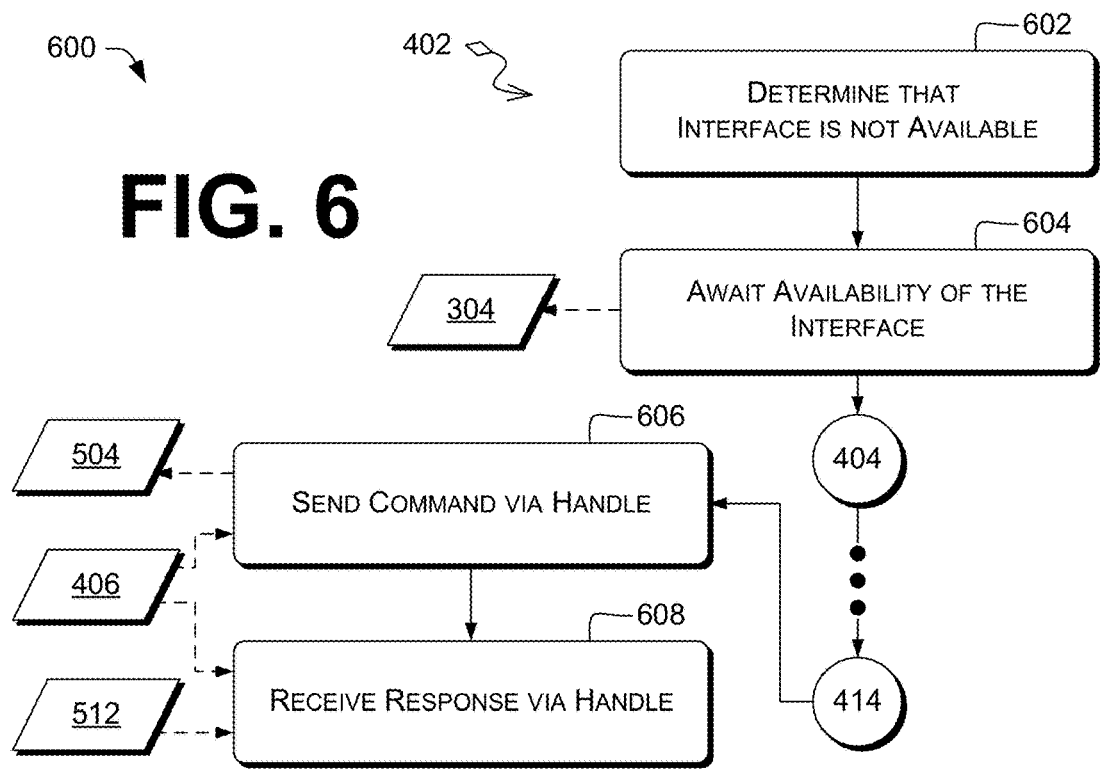

VERIFIED INTER-MODULE COMMUNICATIONS INTERFACE

CROSS-REFERENCE TO RELATED APPLICATIONS

This application is a nonprovisional application of, and claims priority to and the benefit of, U.S. Patent Application Ser. No. 62/618,413, filed Jan. 17, 2018, and entitled "Extensible Driver Interface," the entirety of which is incorporated herein by reference.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, Trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

Many security exploits are delivered through devices on an enumerated bus, such as universal serial bus (USB) devices, or through devices, processes, or threads posing as such devices on an enumerated bus. Other threats tied to devices on an enumerated bus include insider threats (e.g., stealing proprietary information) and insertion of a base device (e.g., on a laptop, by mistake or directly, by a malicious person).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation.

FIG. 3 is a dataflow diagram that illustrates example techniques for providing an interface and communicating via the interface.

FIG. 4 is a dataflow diagram that illustrates example techniques for communicating via an interface.

FIG. 5 is a dataflow diagram that illustrates an example technique for responding to commands sent via an interface.

FIG. 6 is a dataflow diagram that illustrates example techniques for locating and communicating via an interface.

DETAILED DESCRIPTION

Overview

Figure 1:
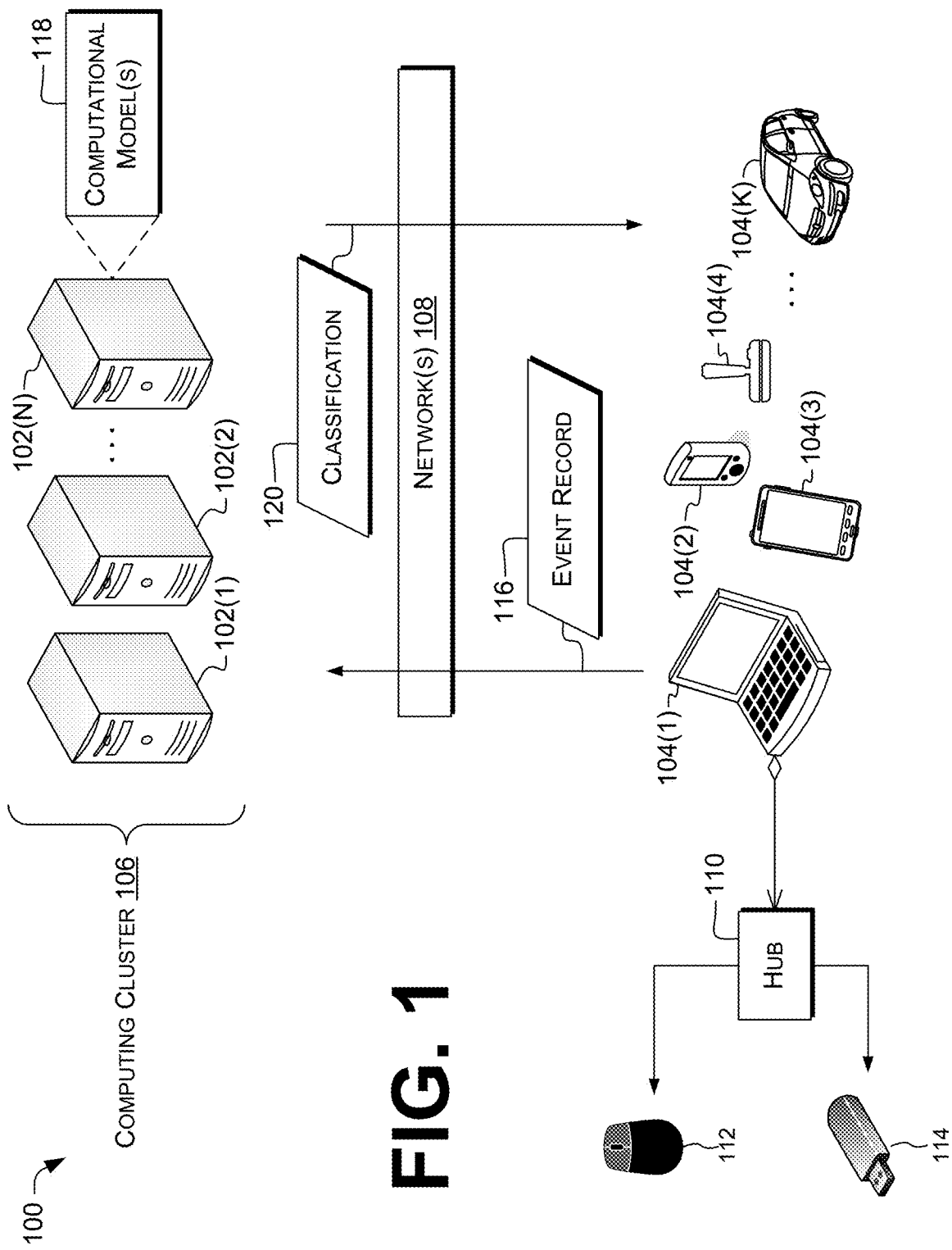
FIG. 1 is a block diagram depicting example scenarios for communicating via interface(s) as described herein.

In some examples, each of one or more monitored computing devices is equipped with a security agent (e.g., a service, driver, or daemon process) to monitor events on that device. Those monitored computing devices may be in communication with devices of a security service system, e.g., implemented using cloud technology. The security service system can filter and analyze events to detect threats or threat patterns. Threats may be introduced by enumerated-bus devices.

Some operating systems, such as MICROSOFT WINDOWS, operate enumerated buses or enumerated-bus devices using device drivers, such as Plug and Play (PnP) device drivers. However, the lifecycle of a PnP device driver (e.g., when the driver is loaded or unloaded) is controlled by the operating system (OS). Therefore, other software wishing to communicate with a PnP device driver may not be able to do so, depending on the lifecycle stage of the PnP driver. Additionally, some software, such as a security-agent device driver, may need to control its own lifecycle, and therefore cannot be used as a PnP driver. There is a need, therefore, for communications techniques that permit software modules with different lifecycles to communicate.

Moreover, multiple PnP or non-PnP device drivers or other software modules may be updated independently. Updating a module to a newer version may add communication capabilities to that module. However, other modules may still be expecting to interface with the older version. There is a need, therefore, for communication techniques that permit software modules to communicate even across upgrades or downgrades of one of the modules. Various aspects relate to interfacing a PnP driver with a non-PnP driver, e.g., a security agent implemented as a driver. PnP drivers, e.g., on WINDOWS, are controlled in part by the PnP manager's state machine. Various aspects permit establishing communication between such drivers and a consumer, e.g., other security driver(s). Various aspects provide an interface ("I/F") that permits communication between modules of different versions or lifecycles by coordinating operations on queues, PnP notifications, or other mechanisms provided by an OS. Various examples operate even in the face of, e.g., surprise removal of a PnP device, or the security-agent driver unloading or updating on the fly while the interface is in use.

Various aspects relate to communication techniques an agent driver can use to communicate with a PnP driver (e.g., that provides control of enumerated-bus devices). Various embodiments are referred to for brevity, without limitation, as "ECL" (external component library). Various embodiments include a cross-platform, extensible communications library that a driver can use to expose multiple interfaces that use different technogies (for example, PnP) to a consumer (user or kernel). The ECL can be used with PnP (e.g., on WINDOWS), or other messaging technologies for WINDOWS or other OSes, including MACINTOSH or LINUX.

For example, in addition to or instead of a PnP implementation, the ECL can provide a communications mechanism using Windows Device input/output (I/O) control (ioctl) I/O request packets (IRPs).

Some examples permit a non-PnP security-agent driver to communicate with a PnP enumerated-bus driver. The PnP driver attaches to device stacks of devices of an enumerated bus (also referred to herein as "enumerated-bus devices") of a computing device (e.g., as upper-device or lower-device filters) based on the device classes of the enumerated-bus devices. For example, the PnP driver may attach to the device stack of a hub or controller device as an upper-device filter and to device stacks of other devices as lower-device filters. While attaching or after attachment, the PnP driver may take action to alter, limit, or otherwise block functionality of an enumerated bus device, such as a USB device. The PnP driver may also perform a system inventory of enumerated-bus devices connected to the computing device and create fingerprints for one or more of the computing devices. For example, the PnP driver may collect information (e.g., USB VID/PID or other identifiers) of enumerated-bus devices connected or connecting to a computing device.

In some implementations, in a decision phase prior to attachment to an enumerated bus device, the PnP driver may compare indicative features of a particular enumerated bus device to configuration policies of the PnP driver and may decide to alter, limit, block, or otherwise modify functionality of that enumerated bus device. Such configuration policies may include combinations of indicative features that form indicators of attack (IoA) associated with known security exploits or devices that contain known malicious firmware or firmware that is determined to be malicious based on static properties extracted from indicative features and/or behavioral properties extracted from inspection of data sent to/from the device. Upon determining that functionality of an enumerated bus device should be modified, the PnP driver stores an indication of the decision and may act upon it in one or more enforcement phases, as specified in configuration policy.

The PnP driver may receive configuration policy from the security-agent driver via an interface such as those described herein (e.g., interface 244 or 304). The PnP driver may additionally or alternatively provide information of an enumerated-bus device to the security-agent driver via an interface 244, 304, and receive decisions about whether to modify functionality of that enumerated-bus device. Additionally or alternatively, the security-agent driver may query the PnP driver via the interface for information about currently- or previously-attached enumerated-bus devices. Additionally or alternatively, the security-agent driver may command the PnP driver via the interface to perform functions, such as power-cycling an enumerated-bus device.

As used herein, "enumerated-bus devices" include a broad range of device types, such as USB devices defined by the USB specification regardless of whether or not those device types are specifically classified as USB devices by the operating system of the computing device. Enumerated-bus devices may include, for instance, any internal or external devices on an enumerated bus.

In an enforcement phase, the PnP driver may alter, limit, or otherwise block the functionality of the enumerated bus device. Such altering, limiting, or blocking may occur during installation for the enumerated bus device, before its driver has been located, or after installation, during a device start for the enumerated bus device. In this latter case, the PnP driver attaches to the USB device as a filter in the device stack of the enumerated bus device. The PnP driver may then fail a device start command from a PnP manager, causing the device start to fail and the device stack for the enumerated bus device to be torn down. Other altering, limiting, or blocking techniques include altering installation strings or capability flags for the enumerated bus device; requesting powering off, disabling, or power cycling of the port for the enumerated bus device; returning a failure status for an add device routine; removing an identifier of the enumerated bus device from an enumeration of enumerated-bus devices; suspending the enumerated bus device by updating a state machine of a hub device; or taking any further action based on the configurable policies.

In some implementations, the PnP driver may also decide to alter, limit, or otherwise block an enumerated bus device after its installation and start based on analysis of traffic associated with the enumerated bus device. For example, the PnP driver, which may be attached to the device stack of the enumerated bus device, may generate traffic and transmit the traffic to the driver for that enumerated bus device. The PnP driver may then monitor the response, and if the response indicates that the enumerated bus device may be different from what it claims to be, the PnP driver may decide to alter, limit, or otherwise block functionality of the enumerated bus device or to monitor it further. The PnP driver may also communicate information determined through traffic analysis with a security agent via an interface 244, 304 described herein.

In various implementations, the PnP driver may inventory the enumerated-bus devices connected to the computing device and provide that information to a security agent via an interface 244, 304 described herein. Such an inventory may be provided in the form of a PnP device tree, for example. The information gathered while inventorying enumerated-bus devices may also be used to create a fingerprint for each enumerated bus device that may be used like a serial number to uniquely identify the enumerated bus device. Such gathered information may also be combined with information maintained by a remote security service to generate the fingerprints.

Throughout this document, "dirty" is used to refer to malicious behavior (e.g., any of the examples listed in the Background) or data associated with, produced by, representing, or indicative of malware, malicious behavior, or other security violations (e.g., activity by an advanced persistent threat adversary). "Clean" is used to refer to behavior or data that is not dirty. A "false detection" or "false positive" is a determination that behavior is malicious when, in fact, it is not. A "false miss" or "false negative" is a determination that behavior is not malicious when, in fact, it is. Various examples permit a security agent to more effectively collect data from other system components, which can reduce the occurrence of false detections or false misses. An example security agent is described in greater detail in U.S. patent application Ser. No. 13/492,672, entitled "Kernel-Level Security Agent" and filed on Jun. 8, 2012, which issued as U.S. Pat. No. 9,043,903 on May 26, 2015, incorporated herein by reference.

Some example techniques described herein refer to detecting and processing security-relevant information. However, communications and interfacing techniques described herein may also apply to other use cases, e.g., use by non-malicious software, processes, or other system components. In some examples, the described techniques are used to facilitate detection, and prevention of, malicious actions at a computer. Some examples use the described techniques for communications in support of activities outside of the field of computer security. Some examples are described with reference to malware, but techniques described herein are not limited to files or events associated with malware.

As used herein, the term "unique identifier" and similar terms encompass both truly unique identifiers (e.g., Ethernet MAC addresses that are unique by construction, or Version 1 GUIDs or UUIDs) and identifiers with a negligible probability of collision (non-uniqueness) (e.g., SHA256 hashes of data uniquely identifying an object, or Version 4 UUIDs). As used herein, a "random" value can be a truly random value, e.g., measured from physical phenomena, or a pseudorandom value. Examples of random values include cryptographically-strong random numbers.

Illustrative Environment

FIG. 1 shows an example scenario 100 in which examples of communications techniques such as those described herein can be performed. Illustrated devices or components of scenario 100 include computing device(s) 102(1)-102(N) (individually or collectively referred to herein with reference 102), for integer N≥1, and computing devices 104(1)-104(K) (individually or collectively referred to herein with reference 104), for integer K≥1. In some examples, N=K; in other examples, N<K or N>K. Although illustrated as, e.g., desktop computers, laptop computers, tablet computers, or cellular phones, computing device(s) 102 or 104 can include a diverse variety of device categories, classes, or types and are not limited to a particular type of device.

In the illustrated example, computing device(s) 102(1)-102(N) can be computing nodes in a cluster computing system 106, e.g., a cloud service such as GOOGLE CLOUD PLATFORM or another cluster computing system ("computing cluster" or "cluster") having several discrete computing nodes (computing device(s) 102) that work together to accomplish a computing task assigned to the cluster as a whole. In some examples, computing device(s) 104 can be clients of cluster 106 and can submit jobs to cluster 106 or receive job results from cluster 106. Cluster 106 can implement a security service cloud or a remote security system.

In some examples, computing devices 102 or 104 can communicate via one or more network(s) 108, to participate in computer-security actions such as those described herein. For example, computing device 104(1) can be or include a monitored computing device or other data source owned or operated by or on behalf of a user, and computing device 102(1) can be a security service system, as described herein. A data source in a computing device 104(1) can provide to cluster 106 data of security-relevant events such as file installations, process launches, logins, or writes to system files. Additionally or alternatively, computing devices 104 can be data sinks and can receive from cluster 106 updates to blacklists or other security-relevant information. Network(s) 108 can include public networks such as the Internet, private networks such as an institutional or personal intranet, or combination(s) of private and public networks.

Computing device 104 can include an enumerated-bus hub 110, e.g., internal or external to the computing device 104. Hub 110 can be, e.g., a USB, FIREWIRE, or other hub. Hub 110 can be a root hub, a non-root hub, or a child hub connected to a root hub. Hub 110 may represent multiple connected hubs of the computing device 104. Hub 110 may include one or more external enumerated-bus ports for physically connecting to external enumerated-bus devices, such as a mouse 112, a thumb drive 114, a keyboard, a microphone, a display device, a speaker, a printer, a barcode reader, an image scanner, a webcam, a game controller, a light pen, a projector, or a digital camera. Any of these devices may include or be communicatively connectable with an enumerated-bus connector that couples with an enumerated-bus port of hub 110.

In the illustrated example, computing devices 104 transmit event records 116 (or other security-relevant information, and likewise throughout) to computing devices 102. Event records 116 can represent or describe activities detected at monitored computing device 104. Computing devices 102 filter and otherwise handle the event records 116 to determine whether events, processes, files, or other system components associated with the event records 116 or other security-relevant information are dirty or otherwise suspicious. For example, computing devices 102 can operate computational model(s), CM(s), 118, to determine a model output corresponding to event(s) on a monitored computing device 104. CM(s) 118 can include, e.g., neural networks, decision trees, regression models, or other models trained (in a supervised or unsupervised manner) to determine whether events or system components are dirty. The model output can include a classification 120, e.g., indicating whether the event(s) or related component(s) are dirty. In some examples, classification 120 is provided to computing device(s) 104. This can permit computing device(s) 104 to, e.g., take mitigation actions in the event of a security violation.

For example, computing device(s) 102 can use the CM(s) 118 to categorize an event or event sequence represented by an event record 116 with respect to association with malware or with a targeted attack. A computing device 104 receive a classification 120 from cluster 106 (e.g., upon request, or as a push notification) and take action based on classification 120. For example, the computing device 104 can terminate process(es), or delete or quarantine file(s), indicated by classification 120 as being dirty. Additionally or alternatively, the computing device 104 can reboot in order to remove dirty software or data from random-access memory (RAM). Additionally or alternatively, the computing device 104 can disable, block, reset, or otherwise alter or control the operation of enumerated-bus devices determined to be dirty, e.g., by adjusting driver behavior, or by causing hub 110 to power-cycle, power-limit, shutdown, or disconnect an enumerated-bus device (e.g., devices 112, 114).

In some examples example, the classification 120 includes a rational or real number (e.g., in floating- or fixed-point representation), a bitmask, an attribute list, a softmax output, or another representation of categories to which the event represented by or associated with an event record 116 belongs, as determined by CM(s) 118. For example, classification(s) 120 can include Boolean value(s) indicating whether or not corresponding event(s) are associated with security violation(s). Additionally or alternatively, classification(s) 120 can include enumerated value(s) indicating with which of several categories the analyzed event(s) are associated (e.g., "benign," "virus," or "spyware"). Classification 120 can additionally or alternatively include one or more confidence values or other values indicating the likelihood of a classification.

Except as expressly indicated otherwise, a determination of whether an event or system component is dirty is carried out programmatically, e.g., by or using CM(s) 118. Various examples herein can be performed without human judgment of whether a component, data stream, or event is in fact malicious. Using CM(s) 118 can permit more identifying potential computational threats, e.g., in the context of an antivirus program, cloud security service, or on-premises security appliance, more readily than in some prior schemes.

In some examples, a security service cloud (e.g., cluster 106) may aggregate and analyze information received from computing device(s) 104 (such as system inventories, enumerated bus device fingerprints, traffic information, user-login identifications, etc.) and may take actions, such as updating configurations of security agents, PnP drivers, or both, or sending commands to the computing devices to take some action (e.g., alter, limit, or otherwise block functionality of a device or process). The security service cloud may also participate in creating fingerprints for enumerated bus devices By way of example and not limitation, computing device(s) 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices or other satellite-based navigation system devices, personal data assistants (PDAs), or other specialized portable electronic devices (e.g., 104(2)), tablet computers, tablet hybrid computers, smartphones, mobile phones, mobile phone-tablet hybrid devices, or other telecommunication devices (e.g., 104(3)), portable or console-based gaming devices or other entertainment devices such as network-enabled televisions, set-top boxes, media players, cameras, or personal video recorders (PVRs) (e.g., 104(4), depicted as a joystick), automotive computers such as vehicle control systems, vehicle security systems, or electronic keys for vehicles (e.g., 104(K), depicted as an automobile), desktop computers, or integrated components for inclusion in computing devices, appliances, or other computing device(s) configured to participate in or carry out communications as described herein, e.g., for file-analysis or malware-detection purposes.

Some cluster-based systems can have all or a portion of the cluster deployed in the cloud. Cloud computing allows for computing resources to be provided as services rather than a deliverable product. For example, in a cloud-computing environment, resources for computation, data manipulation, or other programmatically-controlled operations (e.g., resources such as processor cycles, disk space, RAM space, network bandwidth (uplink, downlink, or both), network connectivity, prioritized network channels such as those used for communications with quality-of-service (QoS) guarantees, backup tape space or mounting/unmounting services, electrical power, software, or information) are provided (for example, through a rental agreement) over a network, such as the Internet. Cloud resources can be provided for internal use within an organization or for sale to outside customers. In some examples, computer security service providers can operate cluster 106, or can operate or subscribe to a cloud service providing computing resources.

In other examples, cluster 106 or computing device(s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device(s) 102 in addition to, or instead of, a cloud service.

Network(s) 108 can include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 108 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX.

As noted above, network(s) 108 can include public network(s) or private network(s). Example private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Illustrative Configurations

Figure 2:
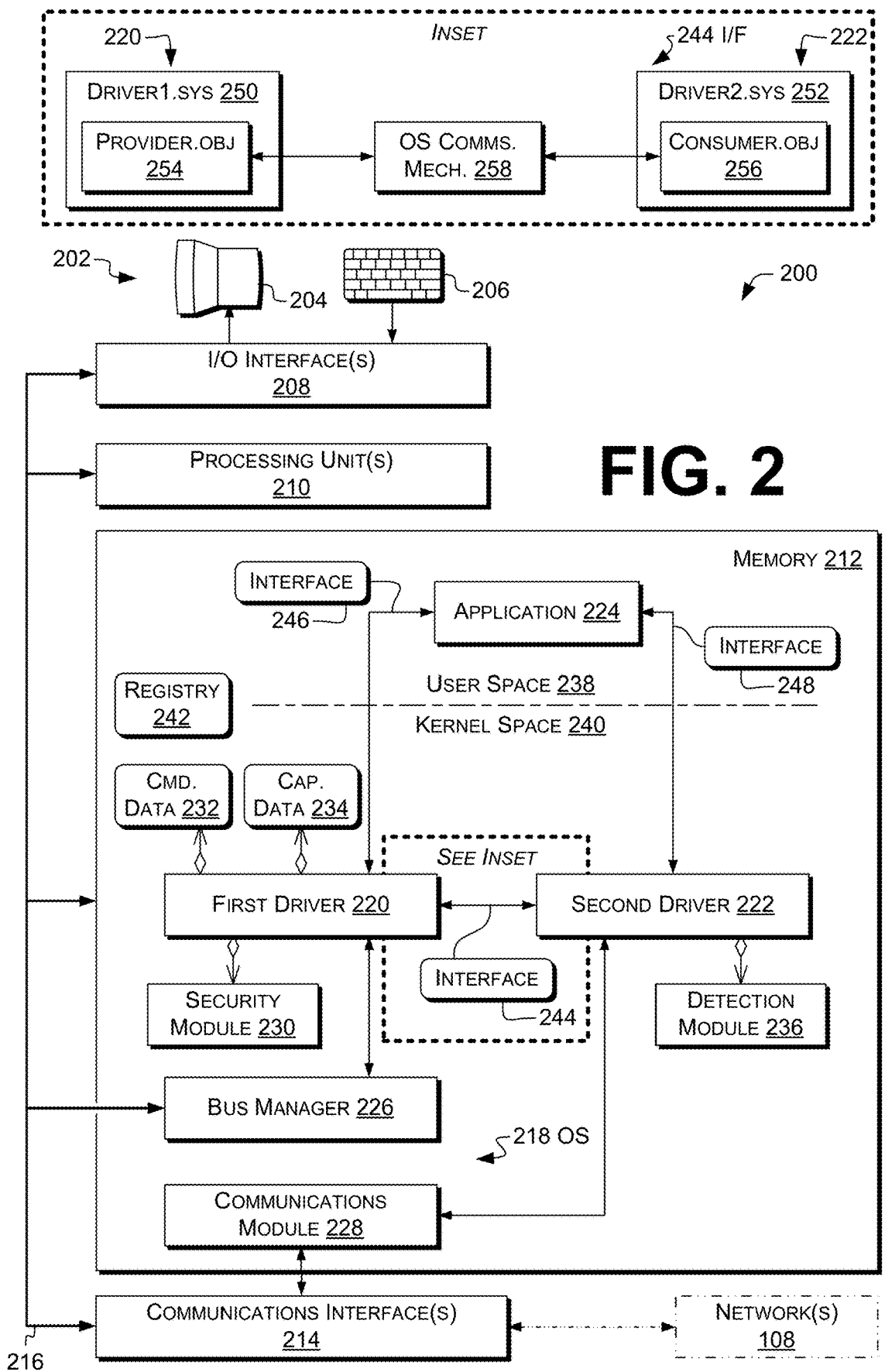
FIG. 2 is a block diagram depicting an example computing device configured to participate in communications or computer security according to various examples described herein.

FIG. 2 is an illustrative diagram that shows example components of a computing device 200, which can represent computing device(s) 102 or 104, and which can be or implement a communications or computer-security system, device, or apparatus, according to various examples described herein. Computing device 200 can include or be included in a system or device for preventing malicious activity by enumerated-bus devices as described herein. In some examples, computing device 200 can be or include at least a portion of a monitored computing device 104. In some examples, a computer-security system includes one or more computing device(s) 200 representing computing device(s) 102 and one or more computing device(s) 200 representing monitored computing device(s) 104.

Computing device 200 can include or be connected to a user interface 202. User interface 202 can include various types of output devices configured for communication to a user or to another computing device 200, such as a display 204 or a printer. User interface 202 can include a user-operable input device 206 (which can represent mouse 112, FIG. 1), such as a keyboard, trackball, touchscreen, or voice-input device.

Computing device 200 can further include one or more I/O interface(s) 208 to allow computing device 200 to communicate with input, output, or I/O devices (for clarity, some not depicted). Examples of such devices can include components of user interface 202 and enumerated-bus devices (such as thumb drive 114, FIG. 1).

The computing device 200 can include one or more processing units 210. Processing units 210 can be operably coupled to the I/O interface 208 and can include or be operably coupled to at least one memory 212, e.g., a RAM, cache, or computer-readable medium (CRM) such as a tangible, non-transitory CRM. Memory 212 can store instructions executable by the processing units 210, or instructions executable by external processing units such as by an external central processing unit (CPU) or external processor of any type discussed herein. Any of these instructions are referred to herein as computer-executable instructions or processor-executable instructions.

Processing units 210 can be or include one or more single-core processors, multi-core processors, CPUs, GPUs, GPGPUs, or hardware logic components configured, e.g., via specialized programming from modules or APIs, to perform functions described herein. For example, processing units 210 can be or include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), or hybrid devices such as a FPGA fabrics with embedded CPU cores.

In some examples, a "control unit" as described herein includes processing units 210. A control unit can also include, if required, memory 212. For example, a control unit can include a CPU or DSP and a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media storing computer-executable instructions.

The computing device 200 can also include a communications interface 214, which can include a transceiver or other network-interface device such as a network interface controller (NIC) to send and receive communications over a network 108 (shown in phantom). Communications interface 214 can include any number of network, bus, memory, or register-file interfaces, in any combination, whether packaged together or separately. In some examples, I/O interface 208 and communications interface 214 are combined in one unit that performs at least some of the functions of each. In some examples, communications interface 214 can include a memory bus internal to a particular computing device 102 or 104, "transmitting" or "providing" data via communications interface 214 can include storing the data in memory 212, and "receiving" via communications interface 214 can include retrieving data from memory 212. In some examples, communications interface 214 can include a datapath providing a connection to a register file within a processing unit. For example, a first software module can load parameters into the register file via the datapath, and then and issue a function call to a second software module. The second software module can retrieve the parameters from the register file and return a result via the register file.

In some examples, the processing units 210 can access module(s) or other instructions or data in memory 212 via a bus 216. I/O interface 208 and communications interface 214 can also communicate with processing units 210 via bus 216. Bus 216 can include, e.g., at least one of a system bus, a data bus, an address bus, a Peripheral Component Interconnect (PCI) Express (PCIe) bus, a PCI bus, a Mini-PCI bus, any variety of local, peripheral, or independent buses, or any combination thereof.

Computer-readable media described herein, e.g., memory 212, includes computer storage media and communication media. Computer storage media includes tangible storage units such as volatile memory, nonvolatile memory, or other persistent, non-transitory, or auxiliary computer storage media, removable and non-removable computer storage media implemented in any technique or technology for storage of information such as computer-readable or -executable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 200.

In contrast to computer storage media, communication media can embody computer-readable or -executable instructions, data structures, program modules, or other data in a modulated data signal, such as a carrier wave, or other transmission mechanism. As defined herein, computer storage media does not include communication media.

Memory 212 can store instructions of an operating system 218, a first driver 220 (e.g., a "device control" driver), a second driver 222, or application 224, e.g., a user program or system-service application, or another system component. In some examples, at least one of the first driver 220 and the second driver 222 (e.g., the first driver 220) is a Plug and Play (PnP) driver. Operating system 218 can include a bus manager 226 (e.g., on WINDOWS, the PnP manager or a subsystem including the PnP manager) and a communications module 228.

The bus manager 226 supports PnP functionality for the OS 218, and may be part of OS 218 or a separate, interfacing component. The bus manager 226 is responsible for PnP device detection and enumeration during a boot phase of the computing device 200 or of attached PnP devices (e.g., enumerated-bus devices) and for adding/removing PnP device drivers while the system is running. PnP devices include enumerated-bus hosts or devices, such as hub 110, mouse 112, or thumb drive 114. Bus manager 226 accordingly manages and interfaces with such devices. For example, bus manager 226 may activate first driver 220 when an enumerated-bus device is connected to computing device 200, and deactivate first driver 220 when the enumerated-bus device is disconnected from computing device 200.

In some examples, the bus manager 226 may call the DriverEntry and AddDevice routines of any PnP device driver (including enumerated-bus device drivers), e.g., first driver 220 in this example. Bus manager 226 may send a start device command (e.g., IRP_MJ_PNP/IRP_MN_START_DEVICE) to PnP device drivers (including drivers for enumerated-bus devices). The bus manager 226 may also build and maintain a PnP device tree of PnP devices on the computing device 200 based on information received from drivers of those PnP devices. The bus manager 226 may deactivate first driver 220 when the enumerated-bus device is disconnected from computing device 200, e.g., by sending a stop-device command (e.g., IRP_MJ_PNP/IRP_MN_STOP_DEVICE) to corresponding PnP device driver(s).

Communications module 228 may operate communications interface 214, e.g., to send event records 116 or receive classifications 120, or to otherwise transfer security-relevant information via network 108. In some examples, communications interface 214 can be a PnP device, and communications module 228 can interact with bus manager 226 to carry out communication functions. In some examples, communications module 228 conveys data between second driver 222 (e.g., a kernel-level security agent) and a security service cloud (cluster 106) accessible via network 108.

First driver 220 can include a security module 230, e.g., configured to detect or mitigate attacks via an enumerated bus. In various examples, security module 230 can perform functions of PnP drivers discussed above (e.g., in the "Overview" section). In some examples, first driver 220 or another interface provider can maintain a queue of data, e.g., security-relevant information or event information, even before a consumer (e.g., second driver 222) connects via the interface. Upon connection, the provider can transmit the contents of the queue to the consumer.

First driver 220 can include (as shown) or otherwise access command data 232 indicating functions supported by first driver 220 over an interface. First driver 220 can include (as shown) or otherwise access capability data 234 indicating interface types or versions supported by first driver 220. In some examples, command data 232 and capability data 234 are combined into one dataset. Second driver 222 can include a detection module 236, e.g., configured to detect malicious activity that affects or might potentially affect computing device 200.

In the illustrated example, security module 230 or detection module 236 e.g., running at a monitored computing device 104, can detect activity at monitored computing device 104 and determine corresponding event record(s) 116. In some examples, communications module 228 can transmit event records 116 determined by detection module 236 to cluster 106. Communications module 228 can receive policy information, whitelists, blacklists, classifications 120, or other security-relevant information from cluster 106 and provide that information to security module 230 or detection module 236. In some examples, security module 230 communicates with detection module 236 but not with communication module 228, and detection module 236 manages communication of security-relevant information regarding enumerated buses or enumerated-bus devices.

Memory 212 can represent computer-executable instructions of any of components 218, 220, 222, 224, 230, or 236 (individually or collectively, "modules") stored on disk or loaded into a RAM or other high-speed memory (or otherwise prepared for execution by processing units 210). In various examples, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, first driver 220 and security module 230 can be combined in a single module that performs at least some of the example functions described below of those modules, or likewise second driver 222 with detection module 236, or communications module 228 with second driver 222 or detection module 236. In some examples, memory 212 can include a subset of the above-described modules.

Processing units 210 can be configured to execute modules of the plurality of modules. For example, the computer-executable instructions stored in memory 212 can upon execution configure a computer such as a computing device 200 to perform operations described herein with reference to the modules of the plurality of modules. The modules stored in the memory 212 can include instructions that, when executed by the one or more processing units 210, cause the one or more processing units 210 to perform operations described below. For example, the computer-executable instructions stored in memory 212 can upon execution configure a computer such as a computing device 102 or 104 to perform operations described herein with reference to the operating system 218 or the above-listed modules 218-236.

For brevity, discussions of functions performed "by" module(s), executable file(s), or similar functional divisions refer, in the context of processor-executable instructions, to functions performed in response to processor-executable instructions of the referred-to module(s). In the context of FPGAs or other control units not using processor-executable instructions, discussions of functions performed "by" module(s) refer to functions performed by the special-purpose logic or other configuration of those module(s).

As shown, memory 212 or contents thereof can be divided into user space 238 and kernel space 240. For example, RAM can be divided into a portion (user space 238) accessible to code running in a user mode of processing units 210 and a separate portion (kernel space 240) not accessible to (or, in some examples, at least partly not writeable by) code running in the user mode. For example, kernel space 240 can be accessible to code running in a kernel mode of processing units 210. In some examples, volatile memory 212 is divided into spaces 238, 240 but non-volatile memory 212 (e.g., a disk) is not. In some examples, access controls applied to non-volatile memory 212 (e.g., access-control lists, ACLs) are different from access controls applied to volatile memory 212 (e.g., processor protection bits).

Various processor architectures implement user mode and kernel mode in various ways. "Kernel mode" as used herein can refer to any privilege level above a normal user-mode (non-privileged) level. For example, in x86 or x64 32-bit protected mode, user mode can be ring 3 and kernel mode can be any of rings 0-2. In x64 64-bit modes, user mode can be ring 3 and kernel mode can be ring 0. Similarly, "kernel mode" can include privileged processor modes used by supervisors or hypervisors in virtualization environments.

In some examples, memory 212 includes registry 242. Registry 242, e.g., a WINDOWS registry, represents a database or other collection of data of low-level settings for the OS 218 and for applications 224 of computing device 200 that are configured to use the registry 242. The registry 242 may also be part of OS 218 or a separate component that interfaces with the OS 218. The kernel of OS 218, device drivers (including enumerated-bus device drivers such as, in this example, first driver 220 or bus manager 226), and other services may all use the registry 242. Settings stored in the registry 242 may be stored as values associated with registry keys of the registry 242. Registry 242 may be stored entirely in user space 238 or entirely in kernel space 240, or (as shown) may include user-space and kernel-space portions. Access controls, e.g., user-specific access controls, may be applied to various portions of the registry.

First driver 220 and second driver 222 can communicate via interface 244. Interface 244 can permit communication between two drivers, e.g., a PnP driver and a non-PnP driver, loaded in kernel space 240 and running in kernel mode. Examples are discussed herein, e.g., with reference to read, write, ioctl, and query-functions operations, executive callbacks, driver-object extensions, notification callbacks, and system-local communications interfaces. Application 224 can communicate with first driver 220 via interface 246, e.g., between a PnP driver and user-mode code. Examples are discussed herein, e.g., with reference to read, write, and ioctl operations, notification messages, and synchronization signals. Application 224 can communicate with second driver 222 via interface 248, e.g., between a non-PnP driver and user-mode code. Examples are discussed herein, e.g., with reference to read, write, and ioctl operations, and synchronization signals. Each of the interfaces 244, 246, 248 can support at least a read operation, a write operation, or an ioctl operation. A particular computing device 200, in operation, may have zero or more of each interface 244, 246, 248 active at any given time.

In some examples, omitted for brevity, techniques described herein with reference to interfaces 244, 246, or 248 are used for communications between two user-mode system components, e.g., application 224 and another application loaded into user space 238, or application 224 and a driver loaded into user space 238 (e.g., a LINUX FUSE driver). For example, two user-mode processes can communicate via a UNIX-domain socket or other communications mechanism provided by OS 218 for use by user-mode processes. Examples are discussed herein, e.g., with reference to communications mechanism 258 and system-local communications interface 824.

For clarity, some examples are described herein with reference to interactions between first driver 220 and second driver 222 via interface 244. In some of these examples, first driver 220 is a provider of interface 244, and second driver 222 is a consumer of interface 244. For example, first driver 220 can be a PnP driver that makes available information regarding enumerated-bus devices via interface 244 to second driver 222, e.g., a security agent. However, these examples are not limiting.

Details of first driver 220, second driver 222, and interface 244 according to some examples are shown in the inset in FIG. 2 (stippled outline). In the illustrated example, first driver 220 includes a first linked executable 250 ("Driver1.sys") and second driver 222 includes a second linked executable 252 ("Driver2.sys"). Each linked executable 250, 252 has statically linked therein a respective object file 254 ("Provider.obj"), 256 ("Consumer.obj"). Object file 254 includes processor-executable instructions to provide interface 244 for use by a consumer (e.g., FIG. 3, 5, or 9-11). Object file 256 includes processor-executable instructions to operate interface 244 to control or make requests of first driver 220 (e.g., FIG. 4 or 6-8). Object files 254 and 256 exchange data using a communications mechanism 258 provided by OS 218, e.g., IPC, RPC, IRPs, pipes, UNIX-domain sockets, direct function calls permitted by OS 218, or other mechanisms described herein (e.g., with reference to FIGS. 3-11). In other examples, functions of object files 254, 256 can additionally or alternatively be provided by dynamically-linked modules.

In various examples, routines in object file 254 can invoke callbacks or otherwise notify code in executable 250 of events pertinent to interface 244. Similarly, routines in object file 256 can invoke callbacks or otherwise notify code in executable 252 of events pertinent to interface 244. Such events can include, e.g., establishment or teardown of a connection via interface 244; availability of new data to be provided to a consumer; receipt of a command from a consumer; or queuing/flow-control events such as XON and XOFF.

In some examples, detection module 236 can include a kernel-level security agent (as shown) or a user-level security agent. In various embodiments, the kernel-level security agent can be installed on the host computing device in the form of a driver, e.g., second driver 222. For example, a driver or other implementation of detection module 236 can use hooks or filter drivers, or monitor memory or log files, as discussed below. In some examples, the detection module 236 can be received from or operable with a security service, e.g., cluster 106.

In some examples, the kernel-level security agent can operate on computing device 104 as a virtual machine/shadow operating system. The kernel-level security agent can load before the operating system 218 of the host computing device, e.g., very early in the boot-time of the host computing device, by some of the first few dozen instructions in some examples. Pre-boot components of detection module 236 can leverage hardware-provided security features, e.g., firmware signing, although this is not required. By loading early in boot-time, the kernel-level security agent significantly reduces the window in which malware can become active and interfere with operation of the host computing device or run unobserved on the host computing device. In some embodiments, by leveraging hardware-based security features, the agent can also validate the integrity of its computing operations and data and additionally enhance the level of security provided.

In some examples, detection module 236 (or security module 230, and likewise throughout this document) can include various components, e.g., various software modules. Components can include collectors, filters, routers/dispatchers, or event consumers. Collectors can receive notifications of events (e.g., file writes and launching executables) from host operating system hooks or filter drivers, from user-mode event monitors, or from threads monitoring log files or memory locations. Filters can filter data of these events, e.g., to remove the need to perform further processing on benign events. Routers/dispatchers can provide data from the filters to event consumer(s), such as correlators or actor components. A correlator component notes the fact of the occurrence of the filtered events. An actor component may, for example, gather forensic data associated with an event and provide an event record including the forensic data. In some examples, routers or dispatchers can transfer information via interfaces such as those described herein.

In various embodiments, a collector may register with a hook or filter driver offered by the operating system 218 to receive notifications of the occurrence or non-occurrence of certain events, such as file creates, reads, and writes, and loading executables. A collector may monitor locations in memory or log files, or spawn a thread to do so, observing events associated with the log files or memory locations. A collector may observe multiple kinds of activities or data, or each kind may be associated with a different collector. The events observed by the collectors may be specified by a configuration of the detection module 236. In some embodiments, the collectors observe all events on the computing device 104 and the configuration specifies configurable filters for filtering and dispatching those events. In other embodiments, the configuration specifies which collectors should be loaded to observe specific types of events. In yet other embodiments, the configuration both specifies which collectors should be loaded and configurable filters for filtering and dispatching events observed by those collectors.

Additionally or alternatively, the detection module 236 may include user mode collectors to observe events that may not be visible to kernel mode processes. Such events could include, for example, rendering of display graphics for display on a display screen of the computing device 104. To observe these events, the detection module 236 is further configured to load user mode collectors as user-mode modules of the computing device 104. Like the kernel-mode collectors described above, user mode collectors may observe multiple kinds of events or activities, or each kind may be associated with a different user mode collector. The events observed by the user mode collectors may be specified by a configuration of the detection module 236. In some embodiments, the user mode collectors observe all user mode events on the computing device 104 and the configuration specifies configurable filters for filtering and dispatching the events. In other embodiments, the configuration specifies which user mode collectors should be loaded to observe specific types of events. In yet other embodiments, the configuration both specifies which user mode collectors should be loaded and configurable filters for filtering and dispatching those events.

Illustrative Techniques

FIG. 3 is a dataflow diagram that illustrates an example technique 300 for providing an interface and communicating via the interface, and related dataflow (shown dashed for clarity). Example functions shown in FIG. 3 and other flow diagrams and example techniques herein can be implemented on or otherwise embodied in one or more computing device(s) 104, e.g., by first driver 220. For the sake of illustration, the example technique 300 is described below with reference to processing unit 210 and other components shown in FIGS. 1 and 2 that can carry out or participate in the steps of the example technique (e.g., a control unit), and with reference to data structures shown in FIGS. 1 and 2. However, other processing units such as processing units 210 or other components of computing device(s) 102 or 104 can carry out step(s) of described example techniques such as technique 300. Similarly, example technique(s) shown in FIGS. 4-11 are also not limited to being carried out by any specifically-identified components.

In software embodiments, the number or arrangement of modules performing functions described herein may be different from that shown in FIG. 2. Accordingly, references to specific modules performing operations described herein are for clarity, and also envision other modules that may perform those operations. In embodiments using a control unit that does not execute computer program instructions, e.g., an FPGA or ASIC, references to specific modules below also envision sections of the hardware of such a control unit that cause the control unit to perform the described operations.

At 302, the control unit can instantiate an interface 304, which can represent interface 244, 246, or 248. The interface 304 is associated with a service routine 306. Service routine 306 can be, e.g., a callback or other function invoked by OS 218 (e.g., by bus manager 226) when a message is sent across the interface. Service routine 306 can additionally or alternatively be a process, thread, or other unit of execution that interacts with consumers via a system-local communications interface such as a UNIX-domain socket. Operation 302 can include invoking OS-provided routines to create resources of any of the types discussed in the following examples of service routine 306.

In some examples, service routine 306 can directly implement operations described herein, or other communications or use-case-specific functions. Additionally or alternatively, service routine 306 can call a worker function through a reference ("ref" or, in the figures, "(ref)") accessible to service routine 306, and the worker function can perform operations described herein with reference to service routine 306. Additionally or alternatively, service routine 306 can perform some functions described herein, and can invoke a worker function to perform other functions described herein.

A ref can include, e.g., a function pointer such as a C "void (*fptr)( )"; a subroutine reference such as a Perl "\&routine"; a call gate, interrupt gate, or other invokable gate, e.g., of an x86 or x64 CPU architecture; an interrupt or system-call number, e.g., the EAX value for an int 0x80 syscall on x86 LINUX or the RAX value for a SYSCALL on x64 LINUX; a pointer to an instance (e.g., a vtable) supporting a predetermined interface or operation, e.g., in C++, "T*" or "T&", where instances of type T support "predetermined_operation( )" or where type T inherits from a predetermined class (concrete, pure-virtual, or otherwise), or in Java, "T", where instances of type T support "predetermined_operation( )" or where type T inherits from a predetermined class, or implements a predetermined interface; both an instance pointer (or equivalent, e.g., a C++ reference) and a member-function pointer, e.g., in C++, "instance_pointer->*mfptr( )"; or a pointer to a COM, DCOM, CORBA, D-Bus, XPCOM, or other object-system interface supporting a predetermined operation. In some examples, a function pointer or method pointer comprises a memory location at which can be found executable code that expects parameters and provides results using a predefined calling convention (e.g., specifying register assignments, memory layouts, stack cleanup, or other function-calling details).

In some examples, operation 302 can include performing, or requesting or triggering OS 218 to perform, any of the following: allocating memory, allocating hardware resources (e.g., IRQ lines or I/O ports), initializing or populating device-descriptor structures, or communicating with other driver(s) or with device(s). In some examples, operation 302 includes invoking the WINDOWS IoCreateDevice routine to create a DEVICE_OBJECT device-descriptor structure.

In some examples, the interface 304 can support a query-functions operation by which a consumer can request refs to routines implemented by the interface 304. For example, a PnP driver (e.g., first driver 220) can respond to a PnP IRP_MN_QUERY_INTERFACE IRP with a structure containing one or more refs to routines. Additionally or alternatively, a provider can respond to an NmrClientAttachProvider request by providing, in a ProviderAttachCallback, an NPI dispatch table including one or more refs to routines. A consumer (e.g., second driver 222) can then invoke any of those routines as indirect function calls, rather than having to invoke via OS 218. OS 218, in some examples, facilitates use of the query-functions operation by making memory of first driver 220 executable by second driver 222 so that second driver 222 can make such a function call. In these and other examples, service routine 306 can be a routine listed in such a structure or other response to a query-functions operation. In some examples, the structure can be or include a vtable or other object structure, e.g., a COM/DCOM interface pointer.

At 308, the control unit can receive, by the service routine 306, a verification message 310. For example, the service routine 306 can be invoked or otherwise called by the OS 218. In some examples, the service routine 306 is a dispatch function referenced by a function-pointer member of a WINDOWS DRIVER_OBJECT descriptor structure, the function-pointer member associated with a request type (IRP_MJ_*). The dispatch-function service routine 306 is called by OS 218 to handle a request of that request type. Verification message 310 can include at least: a message type or other data indicating that message 310 is a verification message; parameters of message 310, e.g., an interface type or version (as discussed below); pointers or other references to parameters; or information indicating how the sender of the verification message 310 expects to receive outputs provided by the control unit or responses to message 310 (e.g., pointers or other references to output buffers).

In some examples, the service routine 306 can be invoked by a module other than OS 218, and provided the verification message 310 as one or more parameters, or in a buffer that is provided as a parameter. This can be done, e.g., after a query-functions operation—the consumer can invoke the service routine 306 directly rather than relying on OS 218 to invoke service routine 306. In some examples, query-functions operations and direct invocation are used only between a kernel-mode producer and a kernel-mode consumer. In some examples, OS 218 invokes a handler routine provided by object file 254. That handler routine then invokes service routine 306 of first linked executable 250 of first driver 220.

In some examples, the service routine 306 blocks on a select(2) or read(2) call, e.g., of a UNIX-domain socket. OS 218 wakes up service routine 306 when data become available or the conditions of the select( ) are satisfied. Service routine 306 then performs operation 308, e.g., including receiving a return value of the select( ) or read( ).

In some examples, the service routine 306 is a POSIX signal handler for a particular signal (e.g., SIGUSR1). When the signal is sent to a process implementing service routine 306, OS 218 schedules service routine 306 to be executed in a thread of that process. In some examples, OS invocation of service routine 306, select( ), read( ), or other IPC, or signal delivery can be used between user-mode and kernel-mode processes, or between two user-mode processes.

In some examples, the service routine 306 is a provider function associated with a Network Programming Interface (NPI) of the WINDOWS Network Module Registrar (NMR), and interface 304 is an NPI associated with a predetermined identifier, e.g., a GUID. The NMR consumer receives a provider dispatch table when attaching, and can then invoke provider functions for which the dispatch table provides refs. NPI/NMR can be used, e.g., for communication between two kernel-mode components.

In some examples, the service routine 306 is registered with a callback object (executive callback). The callback object can have a predetermined name, e.g., a string passed to InitializeObjectAttributes( ). The consumer can invoke the callback object by calling ExNotifyCallback( ). In some examples, callback objects are used for communication between kernel-mode components.

In some examples, a ref to service routine 306 (e.g., a function pointer or other ref described above) is stored in a driver-object extension created by calling IoAllocateDriverObjectExtension( ). The consumer can call ObOpenObjectByName( ) to retrieve the driver object associated with a predetermined name, then call IoGetDriverObjectExtension( ) to get the driver-object extension associated with a predetermined client-identification address. The consumer can then invoke service routine 306 via an indirect call through the ref. In some examples, driver-object extensions are used for communication between kernel-mode components.

The verification message 310 can be received via a write operation, an ioctl operation, or another operation. For example, the service routine 306 can be a handler for an IRP_MJ_WRITE (write, from user or kernel mode), IRP_MJ_DEVICE_CONTROL (ioctl, from user or kernel mode), or IRP_MJ_INTERNAL_DEVICE_CONTROL (ioctl, from kernel mode) IRP, or an ioctl(2) call. For example, a service routine 306 associated with an IRP_MJ$_{13}$ DEVICE_CONTROL ioctl can receive the verification message 310 in an input buffer referenced in the IRP_MJ_DEVICE_CONTROL_IRP.

At 312, the control unit can send a confirmation message 314 via the interface 304. Operation 312 can be performed, e.g., in response to receipt of the confirmation message 314. For example, the confirmation message 314 can be an HRESULT or other return value of service routine 306. Additionally or alternatively, the confirmation message 314 can be loaded into an output buffer that is referenced in an ioctl IRP or that is provided as a parameter to the file_operations member implementing ioctl (e.g., on LINUX). Additionally or alternatively, the confirmation message 314 can be added to a queue of data (stream or message) accessible via a read operation.

In some examples, the control unit can send the confirmation message 314 by calling ExNotifyCallback( ) to signal callback(s) registered by consumer(s) with a callback object (executive callback). The callback object can have a predetermined name.

In some examples, operation 312 includes, before sending the confirmation message 314, validating an interface type or a version (or both) included in or otherwise identified by verification message 310. For example, the control unit can determine that the interface type is supported by first driver 220, or that the version is a version that first driver 220 is configured to use. OS-provided communications mechanisms 258 often provide raw byte transfers without semantic checks. Validating the interface type or version can permit detecting mismatches that might otherwise cause improper operation or reduced functionality. Some examples of validation are described herein with reference to operations 1006 and 1012.

FIG. 4 is a dataflow diagram that illustrates an example technique 400 for communicating via an interface, and related dataflow (shown dashed for clarity). In some examples, technique 400 can be performed by a control unit, as described herein, e.g., of a computing device 200. For example, technique 400 can be performed by second driver 222. In some examples, technique 400 can be used together with technique 300. This is indicated by use of some common reference numbers between FIGS. 3 and 4. In other examples, technique 400 can be used independently of technique 300, and vice versa.

At 402, the control unit can locate the interface 304. For example, the control unit can call SetupDiGetClassDevs( ) and SetupDiEnumDeviceInterfaces( ) functions from user mode to enumerate devices and interfaces that are active on a WINDOWS system. Additionally or alternatively, the control unit can call IoGetDeviceInterfaces( ) from kernel mode to perform this enumeration. On a UNIX (including UNIX-like, e.g., GNU/Linux, and likewise throughout) system, the control unit can use readdir(3) or getdents(2) to read directory entries in the /dev or /proc trees, or in another predetermined location on a filesystem.

From an appropriate one of these sets of interfaces or names, the control unit can select the interface 304 matching predetermined criteria. For example, on WINDOWS, the control unit can select the first interface 304 matching a predetermined device interface class GUID. Additionally or alternatively, the control unit can select the first interface 304 matching a predetermined glob pattern, e.g., </var/provider/pipe/*> or <\\.\pipe\provider*>, or (on UNIX) can select the interface 304 associated with a given (major, minor) device-number pair (e.g., (13, 37)). The criteria can be provided to routines of OS 218 (e.g., SetupDI*( )) to locate candidate interface(s), can be applied to a list of candidates provided by OS 218 after calling readdir( ) or similar functions, or both. Operation 402 can include locating a path or other identifying information that can be used to access interface 304, e.g., "/var/provider/pipe/0" or "ACPI#PNP#{6378776d-696b-4656-8f6c-646669656c64}".

At 404, the control unit can open a handle 406 to the interface 304. For example, the control unit can call CreateFile( ), open(2), fopen(3), connect(2) (e.g., for UNIX-domain sockets) shmat(2) (e.g., for a POSIX shared-memory communications mechanism 258), or other file-access or IPC functions using the path or other identifying information determined at operation 402. The OS 218 can provide the handle 406. Handle 406 can include a file number, file descriptor, FILE*, HANDLE, pointer to an attached shared-memory segment, or other value usable with, or facilitated by, services of OS 218 to identify the interface 304.

In some examples, the control unit can open more than one handle to the interface 304. For example, the control unit can open separate read and write file descriptors, or can open both a file handle (or descriptor) and a handle (or descriptor) to an event that can be signaled (e.g., CreateEvent( )).

At 408, the control unit can send the verification message 310 via the handle 406. For example, the control unit can invoke DeviceIoControl( ), WriteFile( ), ioctl(2), write(2), fprintf(3), fputs(3), or other functions that associate data with handle 406; can write data to a shared-memory segment associated with handle 406; or can retrieve function pointer(s) or other information associated with handle 406 and invoke routines via those pointer(s) or other information. The verification message can identify (e.g., include data representing) at least an interface type 410 or a version 412. For example, interface type 410 and version 412 can be represented by GUIDs (in binary or textual representations), integer numbers, or strings (e.g., reverse domain names). Additionally or alternatively, the control unit can signal an event (e.g., SetEvent( ) or kill(2)).

At 414, the control unit can receive, via the handle 406, the confirmation message 314 associated with the verification message 310. For example, the control unit can receive a return value or output buffer from a DeviceIoControl( ) or ioctl( ) call as confirmation message 314. Additionally or alternatively, the control unit can call read(2), fgets(3), fscanf(3), or similar functions to retrieve data of confirmation message 314 from handle 406. Receiving the confirmation message 314 can indicate to the control unit that communications have been established, e.g., that the interface type 410 or version 412 sent in the verification message 310 have been accepted. Verification of the interface type 410 or version 412 can permit communication between modules even if one may have been upgraded or downgraded differently from the other and therefore be expecting a different type 410 or version 412 than the other.

FIG. 5 is a dataflow diagram that illustrates an example technique 500 for providing an interface and responding to commands sent via the interface, and related dataflow (shown dashed for clarity). In some examples, technique 500 can be performed by a control unit, as described herein, e.g., of a computing device 200. For example, technique 500 can be performed by first driver 220. In some examples, operation 312 can be followed by operation 502.

At 502, the control unit can receive, by the service routine 306, a command 504, which can include a command identifier, parameters, or other data. The command 504 can include data received via a write or ioctl operation, or another operation. Examples are discussed herein, e.g., with reference to operation 308. Command 504 can include a command identifier or other data, e.g., described herein with reference to verification message 310.

In some examples, command 504 does not identify an interface type, does not identify a version, or identifies neither an interface type nor a version. Verifying type or version (operations 308 and 312) before receiving command 504 can permit omitting the verified information from command 504. This can reduce the amount of data to be transferred as part of command 504, which can save memory and reduce the transmission or processing time of command 504.

At 506, the control unit can determine that the command 504 is a valid command based at least in part on stored command data 508 (which can represent command data 232) associated with the interface 304. For example, the command data 508 can include data for each of one or more supported commands. For each supported command, the command data 508 can indicate at least one of: a minimum version that supports the command, an amount of required input, an amount of optional input, type(s) of required input data, type(s) of optional input data, an amount of required buffer space for output, type(s) of output data, or a command identifier, such as a number or name. Verifying type or version, either before receiving command 504 or as part of operation 506, can reduce the probability of negative effects on a computing system due to bugs or version mismatches of software components running on that system and communicating via interface 304, and can reduce the attack surface of interface 304.

In some examples, the control unit can check a command identifier provided in command 504 to see if a command having that identifier is present in command data 508. The control unit can additionally or alternatively check version 412 (if provided) to make sure that it is at least the minimum version specified for that command. The control unit can additionally or alternatively check provided input or output buffer(s) to see whether they meet size or type requirements specified for that command. Types can be checked using, e.g. type fields of type-length-value formats such as ASN.1 encodings or protobufs.

At 510, the control unit can send, via the interface, a response 512 to the command 504. For example, the control unit can return an HRESULT, integer, or Boolean return value, or can provide data in response to the command 504 (e.g., in response to a query command). Additionally or alternatively, the control unit can load data of response 512 into a buffer provided by the caller, e.g., as part of an ioctl operation. Examples are discussed herein, e.g., with reference to operation 312.

FIG. 6 is a dataflow diagram that illustrates example techniques 600 for locating and communicating via an interface, and related dataflow (shown dashed for clarity). In some examples, techniques 600 can be performed by a control unit, as described herein, e.g., of a computing device 200. For example, techniques 600 can be performed by second driver 222. In some examples, operations 602 and 604 can precede operation 404. For example, operation 402 can include operations 602 and 604. In some examples, operation 414 can be followed by operation 606.

In some examples, e.g., of a PnP driver, the interface 304 may not be available at the time a consumer wishes to make use of it. For example, the lifecycle (e.g., startup/activation/deactivation/shutdown triggers and timing) of PnP drivers is controlled by OS 218. Therefore, if OS 218 begins running second driver 222 before initializing first driver 220, second driver 222 will not be able to interact with first driver 220 via interface 304. Some of these examples use operations 602 and 604 to permit drivers 220, 222 to be loaded in either order and still communicate. This can permit interactions between software modules (e.g., drivers or applications) with different lifecycle models regardless of the load or activation order of those modules.

At 602, the control unit can determine that the interface 304 is not available. For example, the control unit can use SetupDi*( ) routines, readdir( ), or other routines described herein with reference to operation 402 to attempt to locate interface 304. In some examples, OS 218 indicates that, or the control unit determines that, no devices of the given device interface class exist, or that no device nodes of particular names or (major, minor) pairs exist. In other examples, OS 218 indicates that, or the control unit determines that, interface 304 is unavailable, e.g., because a process other than that executing operation 602 has an exclusive lock on interface 304 or a device associated therewith or is holding a semaphore or mutex controlling access to interface 304. In response to any of those, the control unit makes the determination that interface 304 is not available.

At 604, the control unit can await availability of the interface 304. Operation 604 can be performed subsequent (e.g., in response) to operation 602. For example, the control unit can sleep, busy-wait, or otherwise wait until the interface 304 or a device or driver associated therewith is loaded, activated, or released by a process holding an exclusive lock. In some examples, the control unit can call select( ), WaitForSingleObject( ), WaitForMultipleObjectsEx( ), read( ), sem_wait(3), or other functions that wait for an event associated with interface 304 to occur, a condition variable associated with interface 304 to be signaled, or a lock on interface 304 to be released.

In some examples, interface 304 is associated with a PnP driver or other driver for which OS 218 supplies lifecycle notifications. In some examples, operation 604 can include, in kernel mode (e.g., by second driver 222), calling IoRegisterPlugPlayNotification( ) or another notification function, and providing a ref to a callback to be invoked when interface 304 becomes available, or may have become available. In some examples, the control unit provides OS 218 information identifying interface 304, e.g., a GUID, and OS 218 invokes the callback only when that specific interface 304 becomes available. In other examples, OS 218 invokes the callback whenever an interface becomes available that may be the interface 304, e.g., when any new instance of a specific device interface class is enabled (GUID_DEVICE_INTERFACE_ARRIVAL). The control unit then, in the callback, determines whether the interface is interface 304. If not, the control unit continues to wait for other invocations of the callback.

In some examples, operation 604 can include, in kernel mode or user mode, calling RegisterDeviceNotification( ) or another function that registers for notifications when interfaces arrive, e.g., all interfaces, or interfaces matching predetermined criteria. Operation 604 can then include waiting for such a notification from OS 218. Examples are discussed herein, e.g., with reference to service routine 306.

In some examples, operation 604 includes waiting for, or receiving, a notification from OS 218. For example, the notification can be a WM_DEVICECHANGE message of a DBT_DEVICEARRIVAL subtype. In some examples, the control unit provides OS 218 with information identifying interface 304, e.g., a GUID, and OS 218 sends the notification only when that specific interface 304 becomes available. In other examples, OS 218 invokes the notification whenever an interface becomes available that may be the interface 304, e.g., when any new instance of a specific device interface class is enabled. The control unit then, in response to the notification, determines whether the interface is interface 304. If not, the control unit continues to wait for other notifications.

In some examples, operation 604 includes creating a process, a thread or other lightweight process (LWP), or a hidden window in which callbacks will be invoked, or to which notifications will be delivered. Some examples of a user-mode consumer awaiting an interface 304 provided by a user- or kernel-mode provider include creating a hidden window to receive the WM_DEVICECHANGE or other notification. Some examples of a kernel-mode consumer awaiting an interface 304 provided by a kernel-mode provider include creating a thread in which device-notification callbacks will be invoked.

Some examples including creating or signaling a thread or other LWP to take action in response to a callback or other notification. Some examples of a kernel-mode consumer awaiting an interface 304 provided by a kernel-mode provider include creating or signaling a worker thread in response to a notification callback. The worker thread can then perform filtering or other processing with reduced chance of deadlock due to activation of an interface by a thread other than a thread in which the callback is delivered.

In some examples, once the handle 406 is open and the interface 304 is verified (e.g., by performing operations 408, 308, 312, 414, e.g., in that order), commands can be sent via the handle 406. Some of these examples include operations 606 and 608.

At 606, the control unit can send, via the handle 406, the command 504. Examples are discussed herein, e.g., with reference to operation 408. In some examples, command 504 does not identify an interface type, does not identify a version, or identifies neither an interface type nor a version. Examples are discussed herein, e.g., with reference to operation 506. Command 504 can be a command defined in, or that otherwise accords with, command data 508. After operation 606 is performed, the provider can perform operations 506 and 510.

At 608, the control unit can receive, via the handle 406, the response 512 to the command 504. Examples are discussed herein, e.g., with reference to operation 414. For example, operation 608 can take place in a consumer subsequent to performance by the provider of operation 510.

Figure 7:
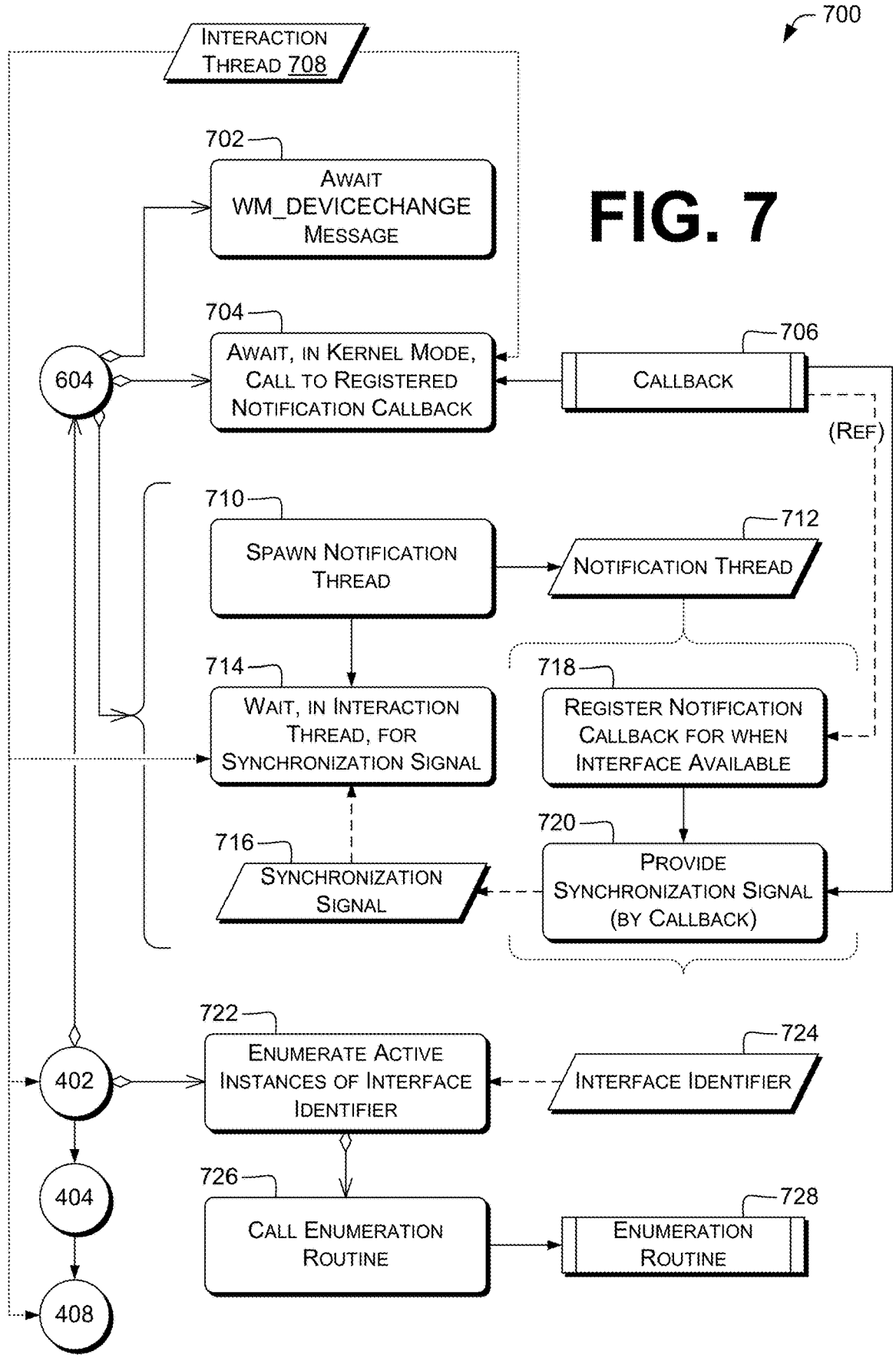
FIG. 7 is a dataflow diagram that illustrates example techniques for communicating via an interface.

FIG. 7 is a dataflow diagram that illustrates example techniques 700 for communicating via an interface, and related dataflow (shown dashed for clarity). In some examples, techniques 700 can be performed by a control unit, as described herein, e.g., of a computing device 200. For example, techniques 700 can be performed by second driver 222 or another consumer of an interface 244, 246, 248. As noted above, operation 402 can include operation 604. In some examples, operation 604 can include operation 702; operation 604 can include operation 704; operation 604 can include operations 710 and 714; operation 604 can be preceded by operation 710 and include operation 714; or operation 402 can include operation 722.

At 702, the control unit can await a WM_DEVICE-CHANGE message. For example, the control unit can await the message in a user mode by running a message loop of a predetermined window until a window procedure of that window is called with a message type of WM_DEVICE-CHANGE (and, in some examples, a WPARAM of DBT_DEVICEARRIVAL or DBT_DEVNODE-S_CHANGE). In some examples, operation 702 or 604 includes calling RegisterDeviceNotification( ) to request from OS 218 delivery of the WM_DEVICECHANGE message before awaiting the message. Examples are discussed herein, e.g., with reference to operation 604.

At 704, the control unit can await, in a kernel mode, a call to a registered notification callback 706. In some examples, operation 704 or 604 includes calling IoRegisterPlugPlayNotification( ) or a similar routine to register notification callback 706 to be invoked by OS 218 when interface 304, or a device supporting interface 304, becomes available. In some examples, represented by the stippled arrow, operation 704 is performed by an interaction thread 708 (or other LWP or process) of a consumer such as second driver 222. The interaction thread 708 can block, e.g., in a call to read( ), WaitForSingleObject( ), or similar synchronization functions, until notification callback 706 runs and satisfies the condition for which the synchronization function is waiting. Additionally or alternatively, the interaction thread 708 can sleep after registering the callback, and the callback can perform operations responsive the availability of interface 304 or a device supporting interface 304.

Some examples of kernel-mode communication use multiple threads in a producer or a consumer. In some examples, the verification message 310 is sent (operation 408) by interaction thread 708. In some of these examples, operation 604 can include performing operations 710-720 in a kernel mode.

At 710, the control unit can spawn a notification thread 712. The notification thread can be a thread that will be notified by OS 218 (e.g., a PnP manager) when interface 304 becomes available. For example, the control unit can call PsCreateSystemThread( ), IoCreateSystemThread( ), kthread_create( ), or another thread-creation routine.

At 714, the control unit can wait, in the interaction thread 708, for a synchronization signal 716. The synchronization signal 716 can be, e.g., a WINDOWS window-procedure event, signaling of a WINDOWS event object, a semaphore V( ), a mutex release, a POSIX signal, signaling of a condition variable, writing of data to a pipe, or another occurrence detectable by interaction thread 708. Examples are discussed herein, e.g., with reference to operation 704.

At 718, the control unit can register the notification callback 706 to be executed in the notification thread 712 when the interface 304 becomes available. Examples are discussed herein, e.g., with reference to service routine 306, operation 604, and operation 704. For example, the control unit can provide a ref to notification callback 706 to a registration routine of OS 218. Registration can be performed in either thread 708, 712 as long as the notification is delivered in the notification thread 712. Operations 714 and 718 are mutually independent. In some examples, operation 718 is performed before operation 714.

Subsequent to operation 718, the notification callback 706 can be invoked by OS 218. At 720, the control unit can, by the notification callback 706, provide the synchronization signal 716. For example, the notification callback 706 can signal any of the types of signals described herein with reference to operation 714. Receiving the notification from OS 218 in notification callback 706 running in notification thread 712, and then delivering the notification to interaction thread 708, can reduce the risk of deadlock due to concurrent attempts by multiple threads to access PnP drivers in WINDOWS, for example. Examples are discussed herein, e.g., with reference to operation 604.

In some examples, the locating (operation 402) is performed by the interaction thread 708. The interaction thread 708 can run in user mode or kernel mode. In some of these examples, operation 402 can include operation 722.

At 722, the control unit can enumerate active device instances associated with a predetermined interface identifier 724, e.g., a device class interface GUID. Examples of identifiers are discussed herein, e.g., with reference to interface type 410. Examples are discussed herein, e.g., with reference to operation 402. In some examples, operation 722 can include operation 726.

At 726, the control unit can call an enumeration routine 728 associated with the mode of the interaction thread 708. For example, one enumeration routine 728 can be used in user mode (e.g., SetupDiGetClassDevs( ) or SetupDiEnumDeviceInterfaces( )), and a different enumeration routine 728 can be used in kernel mode (e.g., IoGetDeviceInterfaces( )).

Figure 8:
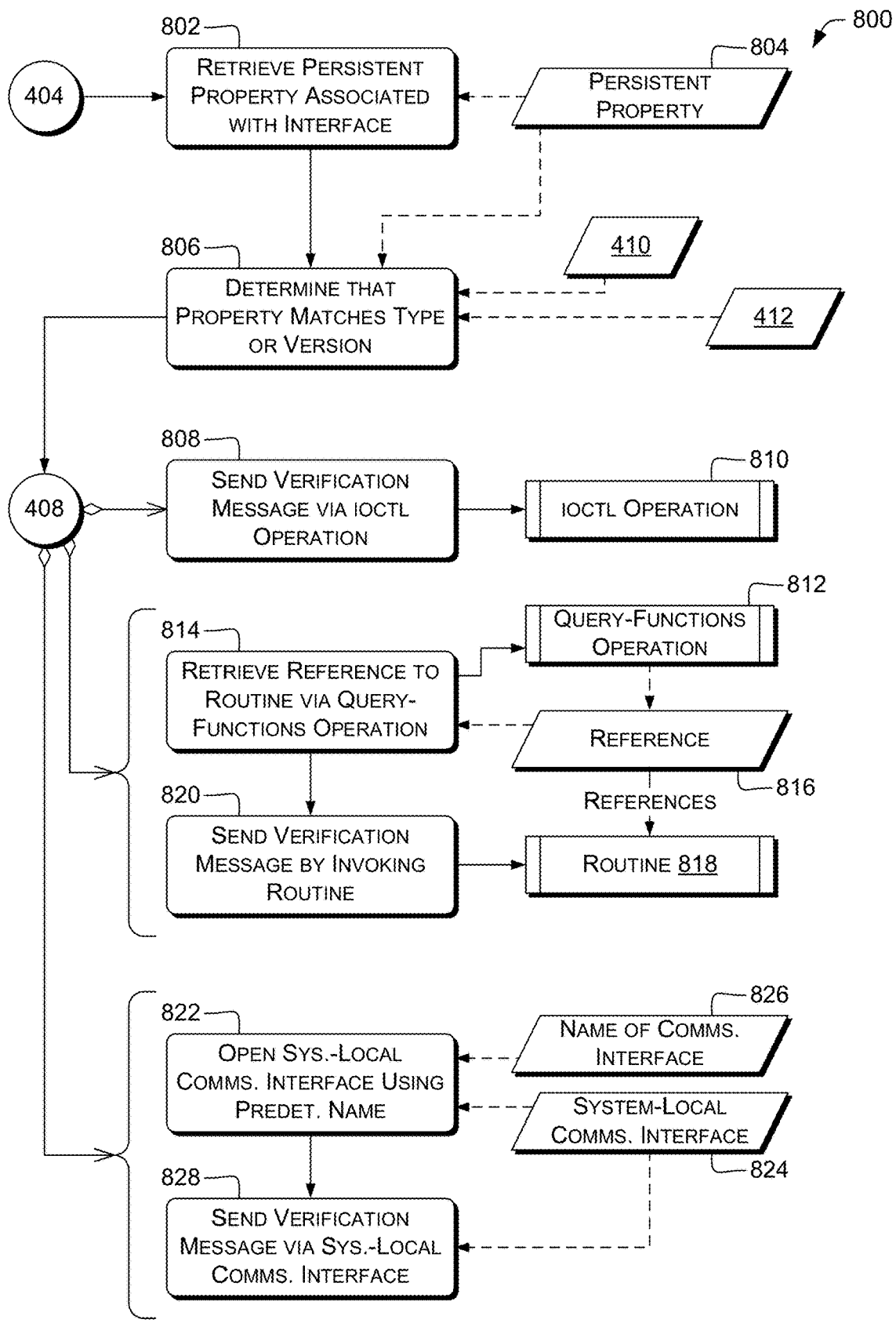
FIG. 8 is a dataflow diagram that illustrates example techniques for communicating via an interface.

FIG. 8 is a dataflow diagram that illustrates example techniques 800 for communicating via an interface, and related dataflow (shown dashed for clarity). In some examples, techniques 800 can be performed by a control unit, as described herein, e.g., of a computing device 200. For example, techniques 800 can be performed by second driver 222 or another consumer of an interface 244, 246, 248. In some examples, operation 404 is followed by operation 802; operation 806 is followed by operation 408; operation 408 includes operation 808; operation 408 includes operations 814 and 820; operation 408 is preceded by operation 814 and includes operation 820; operation 408 includes operations 822 and 828; or operation 408 is preceded by operation 822 and includes operation 828. In some examples, operations 802 and 806 are performed after opening handle 406 (operation 404) and before sending verification message 310 (operation 408).

At 802, the control unit can retrieve a persistent property 804 associated with the interface 304. The persistent property 804 can be, e.g., an interface version or an interface type. For example, the control unit can call SetupDiGetDeviceProperty( ) (e.g., from user or kernel modes) or IoGetDeviceProperty( ) (from kernel mode). Persistent property 804 can be stored in registry 242, the WINDOWS device metadata store, or another datastore that can retain values, e.g., across system reboots. In some examples, the provider (e.g., first driver 220) creates persistent property 804 upon installation. For example, persistent property 804 can be a device property value associated with a custom device property category (e.g., a GUID) and a property identifier (e.g., numeric).

At 806, the control unit can determine that the persistent property 804 matches the corresponding one of the interface type 410 and the version 412. For example, the control unit can determine that value of the persistent property 804 is equal to a value of the corresponding one of the interface type 410 and the version 412.

In some examples, testing for matches at operation 806 can include comparing values with a test other than equality.

For example, interface type 410 or version 412 can specify a minimum or maximum value, or a range of values. Operation 806 can include determining that the persistent property 804 is at least the minimum, at most the maximum, or within the range. This can permit communication between modules that support different but overlapping ranges of versions.

At 808, the control unit can send the verification message 310 via an ioctl operation 810 supported by interface 304. Examples are discussed herein, e.g., with reference to service routine 306 or operation 408.

In some examples, operation 408 is performed by an interaction thread 708 running in kernel mode, as discussed above with reference to FIG. 7. The interface supports a query-functions operation 812, e.g., IRP_MJ_PNP/IRP_MN_QUERY_INTERFACE, CoCreateInstance( ), or NmrRegisterClient/ClientAttachProvider (NPI). Examples are discussed herein, e.g., with reference to service routine 306. Some of these examples include operations 814 and 820.

At 814, the control unit can retrieve from the interface 304, using the query-functions operation 812, a ref 816 to a routine 818. Examples are discussed herein, e.g., with reference to operations 302 or 1126.

At 820, the control unit can send the verification message by invoking the routine 818. For example, the control unit can perform an indirect call or other dispatch through the ref 816. Examples are discussed herein, e.g., with reference to service routine 306 or operation 308.

At 822, the control unit can open a system-local communications interface 824 (which can represent communications mechanism 258) using a predetermined name 826 of the system-local communications interface 824. The system-local communications interface 824 can be, e.g., a UNIX-domain socket. Examples are discussed herein, e.g., with reference to communications mechanism 258 or operations 308, 404, or 1108.

At 828, the control unit can send the verification message 310 via the system-local communications interface 824. For example, the control unit can call write( ), send( ), sendto( ), sendmsg( ), WriteFile( ), ioctl( ), or other writing functions that provide data to the underlying module associated with handle 406.

Figure 9:
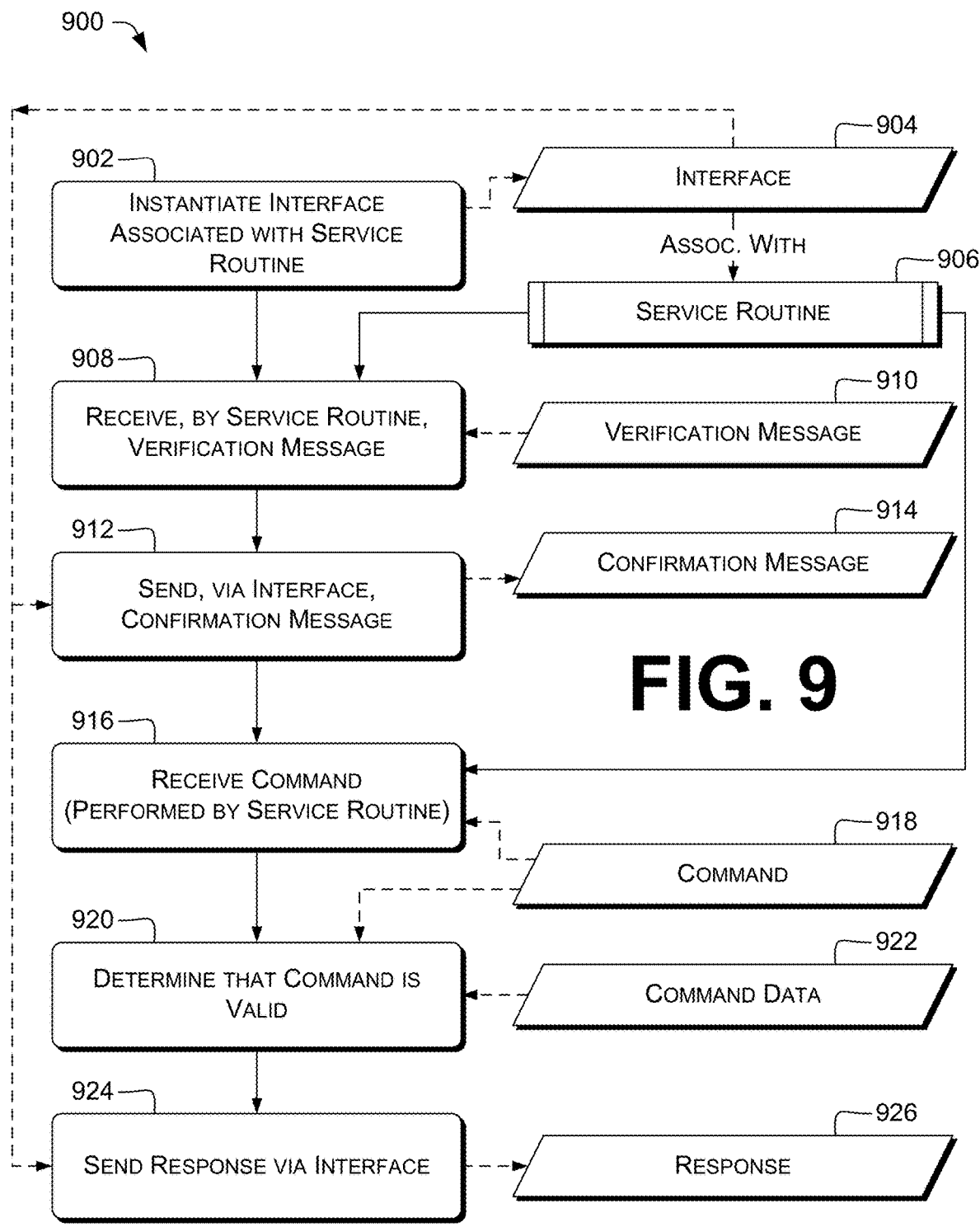
FIG. 9 is a dataflow diagram that illustrates example techniques for providing an interface and communicating via the interface.

FIG. 9 is a dataflow diagram that illustrates an example technique 900 for providing an interface and communicating via the interface, and related dataflow (shown dashed for clarity). In some examples, technique 900 can be performed by a control unit, as described herein, e.g., of a computing device 200. For example, technique 900 can be performed by first driver 220 or another provider of an interface 244, 246, 248. Some examples include at least one CRM carrying processor-executable instructions of a provider module such as first driver 220 or second driver 222, the instructions executable to cause one or more processing units 210 to perform technique 900 (and likewise techniques 1000 and 1100).

At 902, the control unit can instantiate an interface 904 (which can represent interface 244, 246, 248, or 304) associated with the provider module. Examples are discussed herein, e.g., with reference to operation 302. Interface 904 can be associated with a service routine 906.

At 908, the control unit can receive, by a service routine 906 (which can represent service routine 306) of the provider module, a verification message 910 (which can represent verification message 310) associated with the interface 904. Examples are discussed herein, e.g., with reference to operation 308.

At 912, the control unit can send a confirmation message 914 (which can represent confirmation message 314) via the interface 904. Operation 912 can be performed in response to operation 908. Examples are discussed herein, e.g., with reference to operation 312.

At 916, the control unit can receive, by the service routine 906, a command 918 (which can represent command 504) associated with the interface 904. Operation 916 can be performed after or in response to operation 912. Examples are discussed herein, e.g., with reference to operation 502.

At 920, the control unit can determine that the command 918 is a valid command based at least in part on stored command data 922 (which can represent command data 232 or 508). Examples are discussed herein, e.g., with reference to operation 506.

At 924, the control unit can send, via the interface, a response 926 (which can represent response 512) to the command 918. Examples are discussed herein, e.g., with reference to operation 510.

Figure 10:
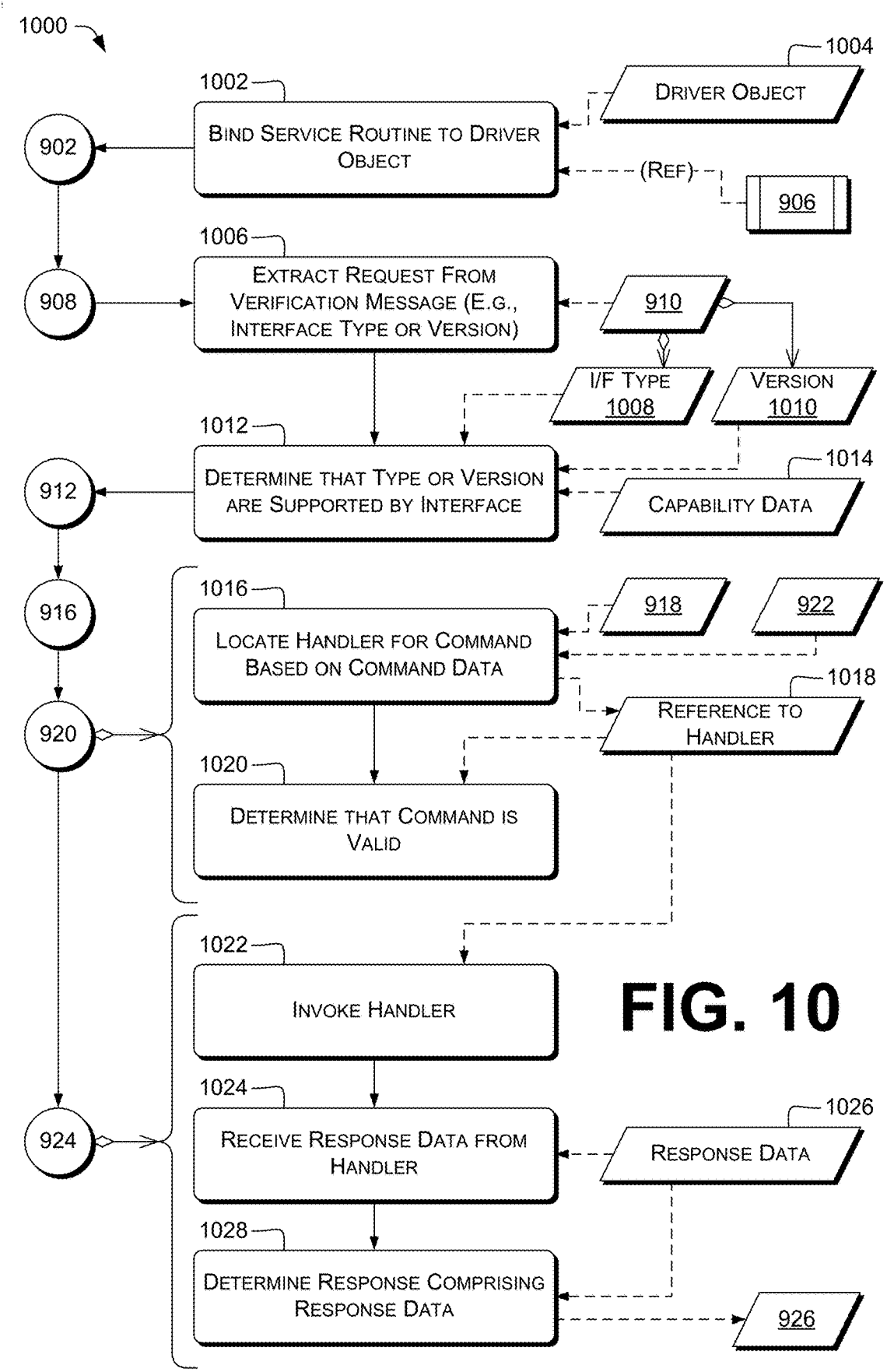
FIG. 10 is a dataflow diagram that illustrates example techniques for providing an interface and communicating via the interface.

FIG. 10 is a dataflow diagram that illustrates example techniques 1000 for providing an interface and communicating via the interface, and related dataflow (shown dashed for clarity). In some examples, techniques 1000 can be performed by a control unit, as described herein, e.g., of a computing device 200. For example, techniques 1000 can be performed by first driver 220 or another provider module. In some examples, operation 1002 precedes operation 902; operation 908 is followed by operation 1006; operation 1012 precedes operation 912; operation 920 includes operations 1016 and 1020; or operation 924 includes or is preceded by any of operations 1022, 1024, or 1028.

At 1002, the control unit can bind, in response to loading of the provider module (e.g., first driver 220), the service routine 906 to a driver object 1004. For example, in a DriverEntry( ) routine provided by the provider module, the control unit can load a ref to service routine 906 into a member of a DRIVER_OBJECT structure (or other driver object 1004) corresponding with an operation to be handled by service routine 906 (e.g., read, write, ioctl, or PnP). Additionally or alternatively, the control unit can load the ref to service routine 906 into an NPI dispatch table, COM interface instance, or other table accessible via a query-functions operation associated with driver object 1004. Examples are discussed herein, e.g., with reference to service routine 306. Operation 1002 can additionally or alternatively include storing a ref to an AddDevice routine into the DRIVER_OBJECT's DriverExtension member, or otherwise storing a ref to a per-device initialization routine where bus manager 226 can access it.

In some examples, operation 1002 can be followed by operation 902. Operation 902 can include, after binding the service routine 906, instantiating the interface 904 associated with the driver object 1004. This can permit OS 218 to route messages on interface 904 via driver object 1004 to service routine 906. For example, operation 902 can be performed by an AddDevice routine or other per-device initialization routine. Separating operations 1002 and 902 can permit loading modules such as drivers 220 and 222 in either relative order, while still permitting discovery of, and communication via, interface 904.

At 1006, the control unit can extract from the verification message 910 a request, e.g., at least one of an interface type 1008 (which can represent I/F type 410) or a version 1010 (which can represent version 412). For example, the control unit can parse the request out of at least a portion of the verification message 910 using a parser for TLV formats, tagged formats such as XML, or custom data formats (e.g., packed binary). Example formats include ASN.1 serializations, GOOGLE protobufs, JSON records, XML documents or subtrees, associative arrays, or other forms of tagged or key-value storage. Operation 1006 can additionally or alternatively include uncompressing, decrypting, or otherwise transforming verification message 910 to determine the request. Operation 1006 can additionally or alternatively include computing checksums of verification message 910 or otherwise validating verification message 910 itself.

At 1012, the control unit can determine that the request is supported by the interface 904 based at least in part on stored capability data 1014 (which can represent capability data 234). The capability data 1014 can include, e.g., a list or range of supported interface type(s) or version(s). Examples are discussed herein, e.g., with reference to operation 806. For example, the request can specify a version 1010, and the capability data 1014 can specify a minimum or maximum version, or a range of versions, supported by the interface 904. Operation 1012 can include determining that the version 1010 is at least the minimum, at most the maximum, or within the range. Operation 1012 can be followed by operation 912.

At 1016, the control unit can locate a handler 1018 for stored command 918 based at least in part on the stored command data 922. In some examples, as shown, the control unit can determine a ref to handler 1018. In some examples, the control unit can index into, or lookup a value in, command data 922 based on a command index or identifier in command 918, and retrieve the ref. In some examples, in addition to or as an alternative to a command index or identifier, the control unit can compare interface types, versions, parameters, or other values to command data 922 to locate a handler 1018. This can permit, for example, multi-dispatch scenarios in which a single command index or identifier maps to one of several different handlers (including handler 1018) depending on the parameters provided.

In some examples (omitted for brevity), if handler 1018 is not found, the control unit can respond to command 918 with an error indication. The error indication can be transmitted or otherwise provided to the consumer in any of the ways described herein with reference to confirmation messages (e.g., as discussed herein with reference to operations 312 or 510).

At 1020, the control unit can determine that the command 918 is a valid command in response to the locating of the handler 1018. That is, since the handler 1018 was located, the control unit can determine that the command 918 is valid. In some examples, operation 1020 can also include validating parameter(s) in command 918, e.g., by applying presence, type, or range checks to parameter(s) based on specifications given in command data 922 of what constitute valid parameter(s).

At 1022, the control unit can invoke the handler 1018. This can be done, e.g., by an indirect function call or method call. Examples are discussed herein, e.g., with reference to service routine 306.

At 1024, the control unit can receive, from the handler 1018, response data 1026. In some examples, the control unit can receive a return value from handler 1018. Additionally or alternatively, handler 1018 can load response data 1026 into a buffer. In some examples, handler 1018 provides other output in addition to response data 1026. Examples are discussed herein, e.g., with reference to service routine 306 or operation 312.

At 1028, the control unit can determine the response 926 comprising the response data 1026. Examples are discussed herein, e.g., with reference to operation 312; techniques for determining confirmation message 314 can additionally or alternatively be used to determine response 926. Operation 1028 can be followed by transmission of the response 926, described herein with reference to operation 924 (FIG. 9).

Figure 11:
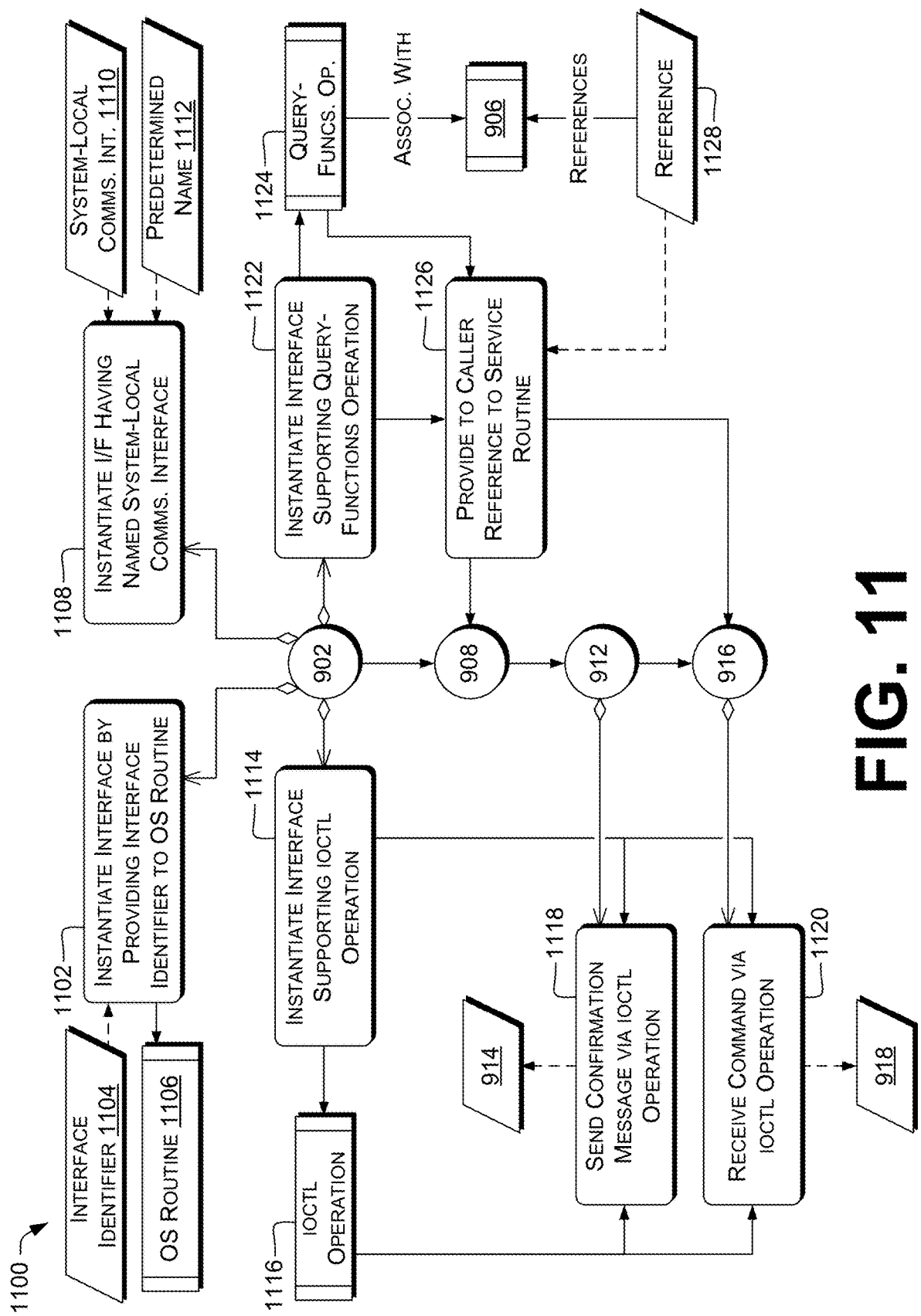
FIG. 11 is a dataflow diagram that illustrates example techniques for providing an interface and communicating via the interface.

FIG. 11 is a dataflow diagram that illustrates example techniques 1100 for providing an interface and communicating via the interface, and related dataflow (shown dashed for clarity). In some examples, techniques 1100 can be performed by a control unit, as described herein, e.g., of a computing device 200. For example, technique 1100 can be performed by first driver 220 or another provider module. In some examples, operation 902 includes operation 1102, 1108, 1114, or 1122; operation 1126 precedes operation 908; operation 912 includes operation 1118; or operation 916 includes operation 1120.

At 1102, the control unit can instantiate the interface 904 at least partly by passing a predetermined interface identifier 1104 of the interface 904 to an OS routine 1106 provided by OS 218 (e.g., IoRegisterDeviceInterface( ). Interface identifier 1104 can include, e.g., a device class interface GUID or other GUID, or another type of identifier herein (e.g., a D-Bus well-known bus name or object path). The OS routine 1106 can create the device or otherwise trigger the OS 218 to send device-available notifications to any registered consumers, in some examples.

At 1108, the control unit can instantiate the interface 904 comprising a system-local communications interface 1110 (which can represent communications mechanism 258) associated with a predetermined name 1112. For example, the control unit can create or open a UNIX-domain socket or named pipe (system-local communications interface 1110) having a specific name 1112 in a filesystem, an Internet-domain socket (1110) bound to localhost and having a specific port number (1112); or a message queue, shared memory segment, or other IPC mechanism (e.g., POSIX or SysV) (1110) having a numeric or string key or ID (1112). Using an interface having a name 1112 can permit decoupling providers and consumers of interfaces, which can increase the robustness of each. Other examples are described herein with reference to operations 822 and 828.

At 1114, the control unit can instantiate the interface 904 supporting an ioctl operation 1116. For example, the control unit can store, into a DRIVER_OBJECT structure associated with interface 904, dispatch routine(s) for IRP_MJ_DEVICE_CONTROL or IRP_MJ_INTERNAL_DEVICE_CONTROL. Additionally or alternatively, the control unit can load a file_operations structure with a handler for ioctl( )s. Examples are discussed herein, e.g., with reference to service routine 306. Operation 1114 can be followed by at least one of operation 1118 or 1120.

At 1118, the control unit can send the confirmation message 914 via the ioctl operation 1116. For example, the control unit can receive an ioctl request from the consumer, and respond via a return value or output buffer of the ioctl operation. Examples are discussed herein, e.g., with reference to service routine 306 or operations 308 or 312.

At 1120, the control unit can receive the command 918 via the ioctl operation 1116. For example, the control unit can receive an ioctl request from the consumer, and the ioctl request can include data of the command 918. Examples are discussed herein, e.g., with reference to service routine 306 or operations 502 or 510.

At 1122, the control unit can instantiate the interface 904 supporting a query-functions operation 1124 associated with the service routine 906. For example, the control unit can load, into a DRIVER_OBJECT structure associated with interface 904, a dispatch routine for IRP_MJ_PNP, and that dispatch routine can be configured to support IRP_MN_QUERY_INTERFACE requests by responding with a structure including a ref to service routine 906. Additionally or alternatively, the query-functions operation 1124 can be a COM/DCOM CoCreateInstance( ) call, and operation 1122 can include registering a GUID of an interface supporting the service routine 906 in registry 242 so that CoCreateInstance( ) can create instances supporting that interface (or corresponding operations for other object systems). Additionally or alternatively, the query-functions operation 1124 can be an interface-request call in another object system, e.g., CORBA or D-BUS, or another function call that returns a vtable pointer or other pointer to a function table or object instance including or supporting service routine 906. Examples are discussed herein, e.g., with reference to service routine 306 or operation 302 or 814.

At 1126, the control unit can provide a ref 1128 to the service routine 906. Operation 1126 can be performed in response to invocation by a caller of the query-functions operation 1124, and can provide the ref 1128 to the caller. For example, in response to receipt from a caller (e.g., a consumer such as second driver 222) of an IRP_MJ_PNP/IRP_MN_QUERY_INTERFACE IRP, or in response to receipt from OS 218 of an NMR ProviderAttachClient callback, the control unit can respond with a function table including ref 1128 to the service routine 906 that the caller can invoke to send data to the provider (e.g., first driver 220). Operation 1126 can be followed by operation 908 or 916, as the caller can invoke the service routine 906 using ref 1128. Examples are discussed herein, e.g., with reference to operations 302 or 308.

Example Clauses

Various examples include one or more of, including any combination of any number of, the following example features. Throughout these clauses, parenthetical remarks are for example and explanation, and are not limiting.

A: A system comprising at least one processing unit, wherein: the system further comprises at least one tangible non-transitory computer-readable storage medium comprising first processor-executable instructions and second processor-executable instructions; the first processor-executable instructions are executable by the at least one processing unit to cause the at least one processing unit to perform first operations comprising: instantiating an interface associated with a service routine; receiving, by the service routine, a verification message; and sending, in response, a confirmation message via the interface; and the second processor-executable instructions are executable by the at least one processing unit to cause the at least one processing unit to perform second operations comprising: locating the interface; opening a handle to the interface; sending the verification message via the handle, the verification message identifying at least an interface type or a version; and receiving, via the handle, the confirmation message associated with the verification message.

B: The system according to paragraph A, wherein: the first operations further comprise: receiving, by the service routine, a command; determining that the command is a valid command based at least in part on stored command data associated with the interface; and sending, via the interface, a response to the command; and the second operations further comprise: sending, via the handle, the command; and receiving, via the handle, the response to the command.

C: The system according to paragraph A or B, the second operations further comprising: determining that the interface is not available; and subsequently, awaiting availability of the interface.

D: The system according to any of paragraphs A-C, wherein: the first processor-executable instructions are associated with a first driver; the second processor-executable instructions are associated with a second driver; and at least one of the first driver and the second driver is a Plug and Play (PnP) driver.

E: A computer-implemented method comprising: locating an interface; opening a handle to the interface; sending a verification message via the handle, the verification message comprising at least an interface type or a version; and receiving, via the handle, a confirmation message associated with the verification message.

F: The computer-implemented method according to paragraph E, the locating comprising: determining that the interface is not available; and subsequently, awaiting availability of the interface.

G: The computer-implemented method according to paragraph F, the awaiting comprising at least: awaiting, in a user mode, a WM_DEVICECHANGE message; or awaiting, in a kernel mode, a call to a registered notification callback.

H: The computer-implemented method according to paragraph F or G, wherein the verification message is sent by an interaction thread and the awaiting comprises at least, in a kernel mode: spawning a notification thread; in the interaction thread, waiting for a synchronization signal; registering a notification callback to be executed in the notification thread when the interface becomes available; and subsequently, providing, by the notification callback, the synchronization signal.

I: The computer-implemented method according to any of paragraphs E-H, wherein: the locating is performed by an interaction thread; the interaction thread runs in a mode selected from the group consisting of a user mode and a kernel mode; and the locating comprises enumerating active device instances associated with a predetermined interface identifier at least partly by calling an enumeration routine associated with the mode of the interaction thread.

J: The computer-implemented method according to any of paragraphs E-I, further comprising, after the opening and before the sending: retrieving a persistent property associated with the interface, the persistent property selected from the group consisting of an interface version and an interface type; and determining that the persistent property matches the corresponding one of the interface type and the version.

K: The computer-implemented method according to any of paragraphs E-J, wherein: the interface supports an ioctl operation; and the method further comprises sending the verification message via the ioctl operation.

L: The computer-implemented method according to any of paragraphs E-K, wherein: the sending is performed by an interaction thread running in a kernel mode; the interface supports a query-functions operation; the method comprises retrieving from the interface, using the query-functions operation, a reference to a routine; and the method further comprises sending the verification message by invoking the routine.

M: The computer-implemented method according to any of paragraphs E-L, further comprising: opening a system-local communications interface using a predetermined name of the system-local communications interface; and sending the verification message via the system-local communications interface.

N: At least one tangible non-transitory computer-readable storage medium comprising processor-executable instructions of a provider module, the processor-executable instructions executable by at least one processing unit to cause the at least one processing unit to perform operations comprising: instantiating an interface associated with the provider module; receiving, by a service routine of the provider module, a verification message associated with the interface; sending, in response, a confirmation message via the interface; subsequently, receiving, by the service routine, a command associated with the interface; determining that the command is a valid command based at least in part on stored command data; and sending, via the interface, a response to the command.

O: The at least one tangible, non-transitory computer-readable medium as recited in paragraph N, the operations comprising: in response to loading of the provider module, binding the service routine to a driver object; and instantiating the interface after binding the service routine, the interface associated with the driver object.

P: The at least one tangible, non-transitory computer-readable medium as recited in paragraph N or O, the operations comprising, before sending the confirmation message, extracting from the verification message at least one of an interface type or a version; and determining that the at least one of the interface type or the version is supported by the interface based at least in part on stored capability data.

Q: The at least one tangible non-transitory computer-readable storage medium according to any of paragraphs N-P, the operations further comprising: locating a handler for the command based at least in part on the stored command data; determining that the command is a valid command in response to the locating of the handler; invoking the handler; receiving, from the handler, response data; and determining the response comprising the response data.

R: The at least one tangible non-transitory computer-readable storage medium according to any of paragraphs N-Q, the operations further comprising instantiating the interface at least partly by passing a predetermined interface identifier of the interface to an operating-system (OS) routine.

S: The at least one tangible non-transitory computer-readable storage medium according to any of paragraphs N-R, the operations comprising: instantiating the interface supporting an ioctl operation; and at least: sending the confirmation message via the ioctl operation; or receiving the command via the ioctl operation.

T: The at least one tangible non-transitory computer-readable storage medium according to any of paragraphs N-S, the operations comprising: instantiating the interface supporting a query-functions operation associated with the service routine; and in response to invocation by a caller of the query-functions operation, providing to the caller a reference to the service routine.

U: The at least one tangible non-transitory computer-readable storage medium according to any of paragraphs N-T, the operations comprising instantiating the interface comprising a system-local communications interface associated with a predetermined name.

V: As any of paragraphs B-D or N-U, wherein the command does not identify an interface type, does not identify a version, or identifies neither an interface type nor a version.

W: Any of paragraphs A-D, E-M, or N-U, further comprising taking a mitigation action against an enumerated-bus device in response to policy information received via the interface.

X: A computer-readable medium, e.g., a computer storage medium, having thereon computer-executable instructions, the computer-executable instructions upon execution configuring a computer to perform operations as any of paragraphs A-D, E-M, N-U, V, or W recites.

Y: A device comprising: at least one processing unit; and a computer-readable medium, e.g., a computer storage medium, having thereon computer-executable instructions, the computer-executable instructions upon execution by the at least one processing unit configuring the device to perform operations as any of paragraphs A-D, E-M, N-U, V, or W recites.

Z: A system comprising: means for processing; and means for storing having thereon computer-executable instructions, the computer-executable instructions including means to configure the system to carry out a method as any of paragraphs A-D, E-M, N-U, V, or W recites.

Conclusion

Various interface-management and communication techniques described herein can permit modules with different lifecycles or versions to communicate. This can increase the robustness with which components of a security solution can communicate, reducing the chance of security failures. Some examples permit a security agent to monitor or control enumerated-bus devices. Some examples permit communication in systems that do not include enumerated busses or enumerated-bus devices.

Various examples decouple modules that have separate lifecycle constraints, e.g., PnP drivers and non-PnP drivers, while still permitting those modules to communicate. This can reduce the chance of race conditions, e.g., between communications to or from a PnP driver and OS actions to activate or deactivate that driver. For example, techniques of FIGS. 3-6 permit either a PnP or a non-PnP driver to start first, and communication to be established reliably when both are up. Various examples permit communicating with WINDOWS PnP drivers outside of the flow of data to or from a physical device, which is not possible in some prior schemes.

Some examples may provide any of, or none of, the benefits listed herein, or other benefits. The claims are not limited to examples providing the benefits described above, and at least one embodiment within the scope of the claims may not provide any of the benefits described above. Furthermore, the claimed subject matter is not limited to implementations that solve any or all disadvantages noted in any part of this disclosure.

The "Overview" section above is intended only to provide a brief overview of subject matter disclosed herein according to one or more illustrative embodiments, and does not serve as a guide to interpreting the claims or to define or limit scope. The Overview is provided to introduce illustrative features in a simplified form; these features are further described in the sections following the Overview. The Overview is not intended to identify key features or essential features of the claimed subject matter, nor is it intended to be used as an aid in determining the scope of the claimed subject matter. The claimed subject matter is not limited to implementations that solve any or all disadvantages noted herein. The claimed subject matter is not limited to implementations that provide at least one of the results listed herein. Subsection headers in the Detailed Description are solely for convenience in reading. Some examples include features from only one subsection. Some examples include features from more than one subsection.

The word "or" and the phrase "or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," or any of those phrases with "or" substituted for "or," unless specifically stated otherwise, is to be understood as signifying that an item, term, etc. can be either X, or Y, or Z, or a combination of any elements thereof (e.g., a combination of XY, XZ, YZ, or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" is synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

Although some features and examples herein have been described in language specific to structural features or methodological steps, it is to be understood that the appended claims are not necessarily limited to the specific features or steps described herein. Rather, the specific features and steps are disclosed as preferred forms of implementing the claimed examples. For example, computing devices 102 or 104, network 108, processing units 210, or other structures described herein for which multiple types of implementing devices or structures are listed can include any of the listed types, or multiples or combinations thereof.

Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method," "methods," "technique," "techniques," and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Some operations of example techniques or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described techniques. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing. In each flow diagram, fewer than all of the depicted operations can be performed, except as expressly noted.

Each illustrated block (e.g., the operations in each of FIGS. 3-11) can represent one or more operations that can be implemented in hardware, software, or a combination thereof. In the context of software, the operations described herein represent computer-executable instructions stored on at least one computer-readable medium (e.g., computer storage medium) that, when executed by one or more processing units, cause or enable the one or more processing units to perform the recited operations. In the context of hardware, the operations represent logic functions implemented in circuitry, e.g., datapath-control and finite-state-machine sequencing functions. Therefore, descriptions of operations herein also describe such software or hardware structures to carry out the described functions. Generally, computer-executable instructions include routines, programs, objects, modules, code segments, components, data structures, and the like that perform particular functions or implement particular abstract data types.

Accordingly, the methods, techniques, or operations described above can be embodied in, and fully automated via, software code modules executed by one or more computers or processing units. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality or similar functionality can be arranged differently (e.g., combined into a smaller number of modules, broken into a larger number of modules, etc.). In some instances, the functionality or modules discussed herein may be implemented as part of a computer operating system (OS) 218. In other instances, the functionality or modules may be implemented as part of a device driver, firmware, application, or other software subsystem.

What is claimed is:

1. A system comprising:
at least one processing unit; and
at least one tangible non-transitory computer-readable storage medium comprising first processor-executable instructions and second processor-executable instructions,
wherein the first processor-executable instructions are executable by the at least one processing unit to cause the at least one processing unit to perform first operations, associated with a first driver, comprising:
instantiating an interface associated with communications between the first driver and a second driver, wherein the interface is associated with a service routine that is configured to be invoked based on a message being sent across the interface;
receiving, via the service routine, a verification message; and
sending, in response to receiving the verification message, a confirmation message associated with the verification message via the interface, and
wherein the second processor-executable instructions are executable by the at least one processing unit to cause the at least one processing unit to perform second operations, associated with the second driver, comprising:
locating the interface;
opening a handle to the interface;
sending the verification message via the handle, the verification message identifying at least an interface type or an interface version; and
receiving, via the handle, the confirmation message associated with the verification message.

2. The system according to claim 1, wherein:
the first operations further comprise:
receiving, via the service routine, a command;
determining that the command is a valid command, based at least in part on stored command data associated with the interface; and
sending, via the interface, a response to the command, and
the second operations further comprise:
sending, via the handle, the command; and
receiving, via the handle, the response to the command.

3. The system according to claim 1, wherein locating the interface comprises:
determining that the interface is not available; and
in response to determining that the interface is not available, awaiting availability of the interface.

4. The system according to claim 1, wherein at least one of the first driver or the second driver is a Plug and Play (PnP) driver.

5. A computer-implemented method comprising:
locating, by a second driver, an interface associated with a first driver, wherein the interface is associated with a service routine that is configured to be invoked based on a message being sent across the interface;
opening, by the second driver, a handle to the interface;
sending, by the second driver, a verification message to the first driver via the handle, wherein the verification message indicates at least one of an interface type or an interface version; and
receiving, by the second driver and from the first driver via the handle, a confirmation message associated with the verification message.

6. The computer-implemented method according to claim 5, wherein the locating comprises:
determining, by the second driver, that the interface is not available; and
in response to determining that the interface is not available, awaiting availability of the interface.

7. The computer-implemented method according to claim 6, wherein the awaiting comprises at least one of:
awaiting, in a user mode, a notification from an operating system indicating that the interface is available, or
awaiting, in a kernel mode, a call to a registered notification callback.

8. The computer-implemented method according to claim 6, wherein the verification message is sent by an interaction thread and the awaiting comprises at least, in a kernel mode:
spawning a notification thread;
in the interaction thread, waiting for a synchronization signal;
registering a notification callback to be executed in the notification thread when the interface becomes available; and
providing, by the notification callback, the synchronization signal.

9. The computer-implemented method according to claim 5, wherein:
the locating is performed by an interaction thread,
the interaction thread runs in a mode selected from a group consisting of a user mode and a kernel mode, and
the locating comprises enumerating active device instances associated with a predetermined interface identifier at least partly by calling an enumeration routine associated with the mode of the interaction thread.

10. The computer-implemented method according to claim 5, further comprising, after the opening and before the sending:
retrieving a persistent property associated with the interface; and
determining that the persistent property matches one of the interface type or the interface version.

11. The computer-implemented method according to claim 5, wherein:
the interface supports an input/output control (ioctl) operation, and
the verification message is sent via the ioctl operation.

12. The computer-implemented method according to claim 5, wherein:
the sending is performed by an interaction thread running in a kernel mode,
the interface supports a query-functions operation,
the computer-implemented method further comprises retrieving from the interface, using the query-functions operation, a reference to the service routine, and
sending the verification message comprises invoking the service routine.

13. The computer-implemented method according to claim 5, further comprising:
opening a system-local communications interface using a predetermined name of the system-local communications interface, wherein the verification message is sent via the system-local communications interface.

14. At least one tangible non-transitory computer-readable storage medium comprising processor-executable instructions associated with a first driver that, when executed by at least one processing unit, cause the at least one processing unit to perform operations, associated with the first driver, comprising:
- instantiating an interface associated with the first driver, wherein the interface is associated with a service routine configured to be invoked based on a message being sent across the interface;
- receiving, via the service routine and from a second driver, a verification message associated with the interface;
- sending, in response to receiving the verification message, a confirmation message to the second driver via the interface;
- receiving, via the service routine, a command associated with the interface;
- determining that the command is a valid command based at least in part on stored command data associated with the interface; and
- sending, via the interface, a response to the command.

15. The at least one tangible non-transitory computer-readable storage medium according to claim 14, the operations further comprising:
- binding the service routine to a driver object associated with the interface,
- wherein instantiating the interface is performed after binding the service routine.

16. The at least one tangible non-transitory computer-readable storage medium according to claim 14, the operations further comprising, before sending the confirmation message:
- extracting, from the verification message, at least one of an interface type or an interface version; and
- determining that the at least one of the interface type or the interface version is supported by the interface, based at least in part on stored capability data associated with the first driver.

17. The at least one tangible non-transitory computer-readable storage medium according to claim 14, the operations further comprising:
- locating a handler for the command based at least in part on the stored command data;
- determining that the command is the valid command in response to the locating of the handler;
- invoking the handler;
- receiving, from the handler, response data; and
- determining the response comprising the response data.

18. The at least one tangible non-transitory computer-readable storage medium according to claim 14, wherein instantiating the interface comprises passing a predetermined interface identifier of the interface to an operating-system (OS) routine.

19. The at least one tangible non-transitory computer-readable storage medium according to claim 14, wherein:
- the interface supports an input/output control (ioctl) operation, and
- at least one of sending the confirmation message or receiving the command is performed via the ioctl operation.

20. The at least one tangible non-transitory computer-readable storage medium according to claim 14, wherein:
- the interface supports a query-functions operation associated with the service routine and
- the operations further comprise, in response to invocation by a caller of the query-functions operation, providing to the caller a reference to the service routine.

21. The at least one tangible non-transitory computer-readable storage medium according to claim 14, wherein the interface comprises a system-local communications interface associated with a predetermined name.

* * * * *